Sept. 29, 1970  D. R. SHOTTER  3,530,570
MACHINE TOOL WITH AUTOMATIC TOOL CHANGE FACILITIES
Filed Feb. 2, 1968  21 Sheets-Sheet 1

INVENTOR
Douglas R. Shotter
BY
ATTORNEYS

Sept. 29, 1970    D. R. SHOTTER    3,530,570
MACHINE TOOL WITH AUTOMATIC TOOL CHANGE FACILITIES
Filed Feb. 2, 1968    21 Sheets-Sheet 4

INVENTOR
Douglas R. Shotter

Sept. 29, 1970  D. R. SHOTTER  3,530,570
MACHINE TOOL WITH AUTOMATIC TOOL CHANGE FACILITIES
Filed Feb. 2, 1968  21 Sheets-Sheet 6

INVENTOR
Douglas R. Shotter

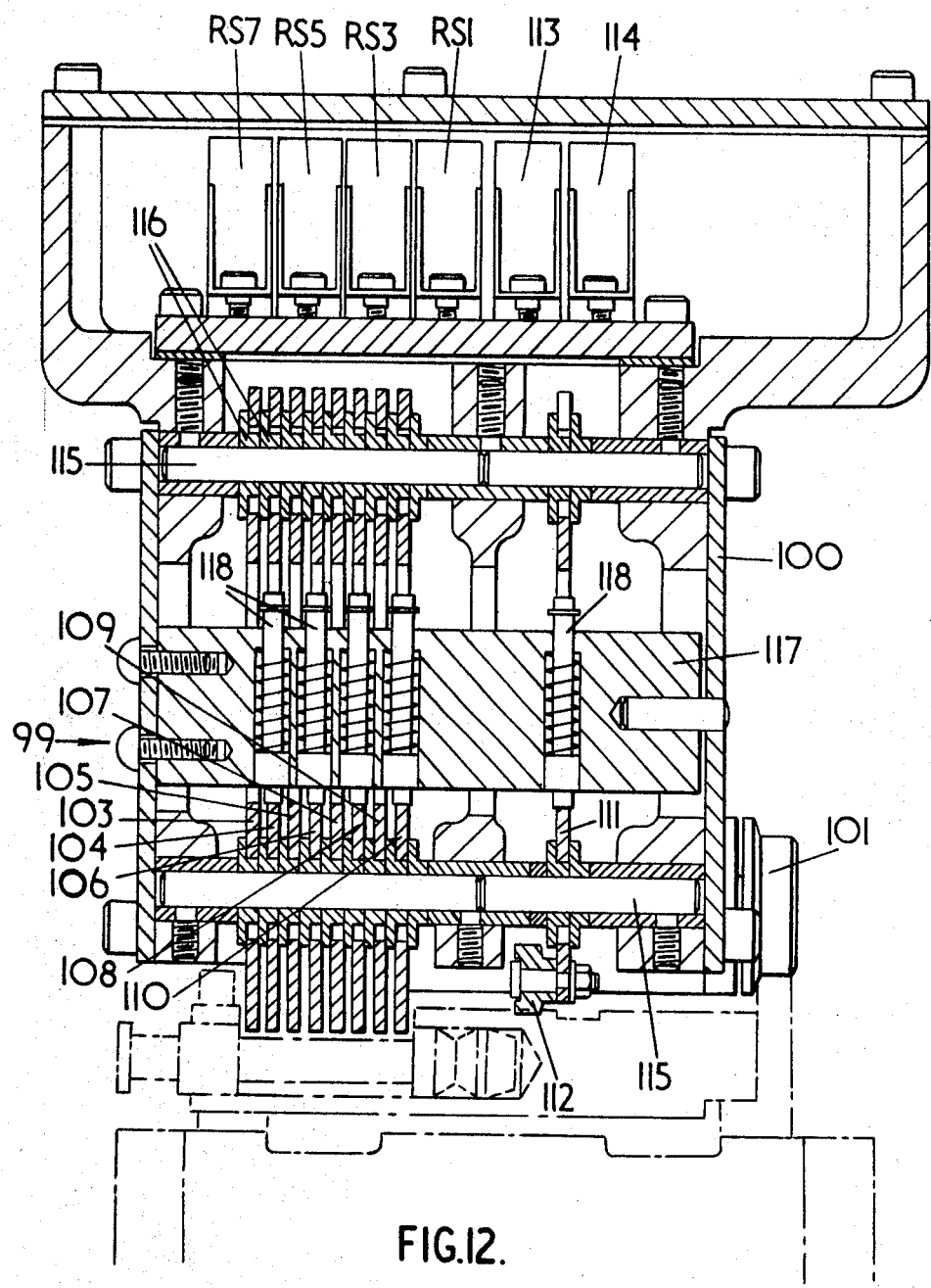

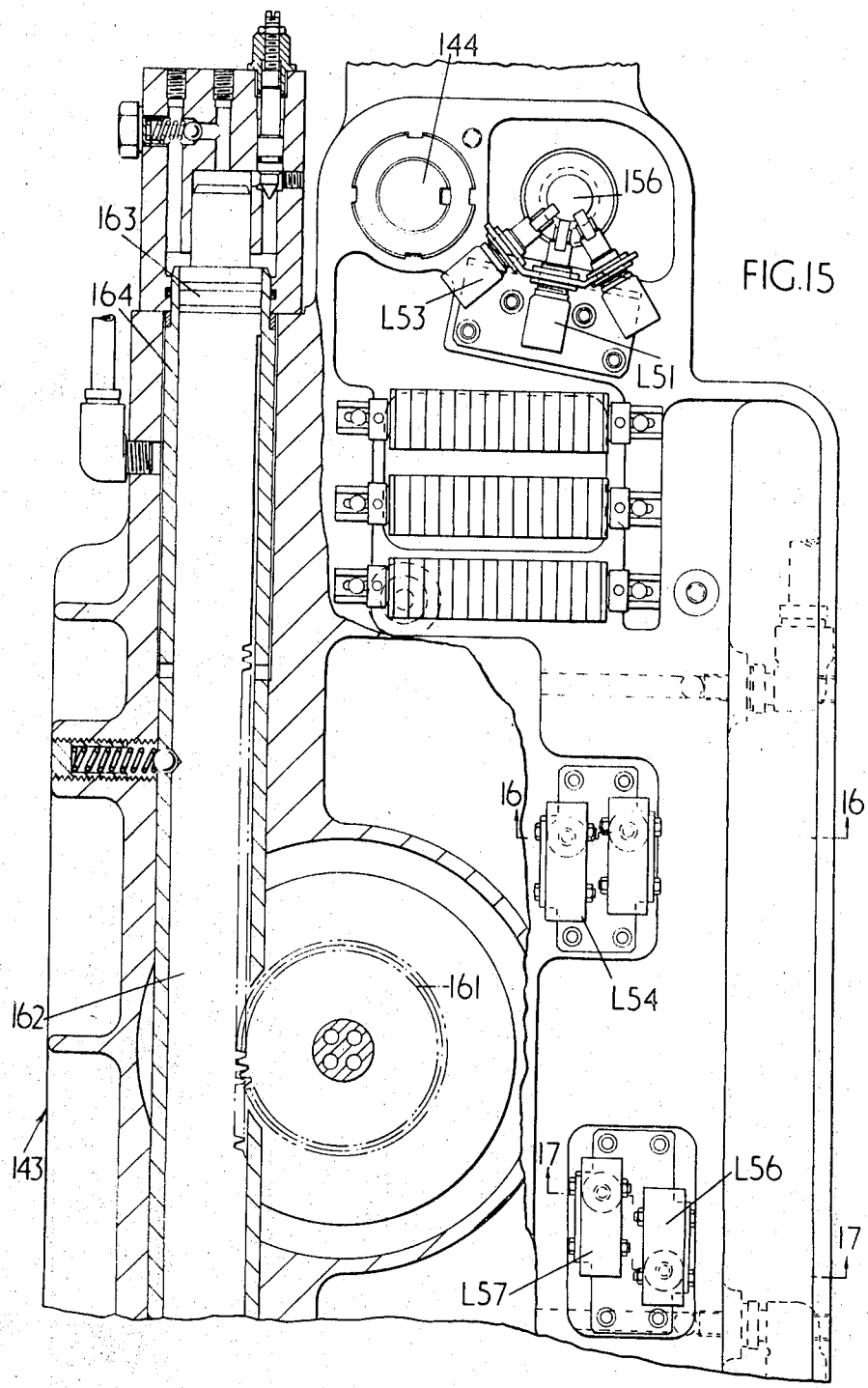

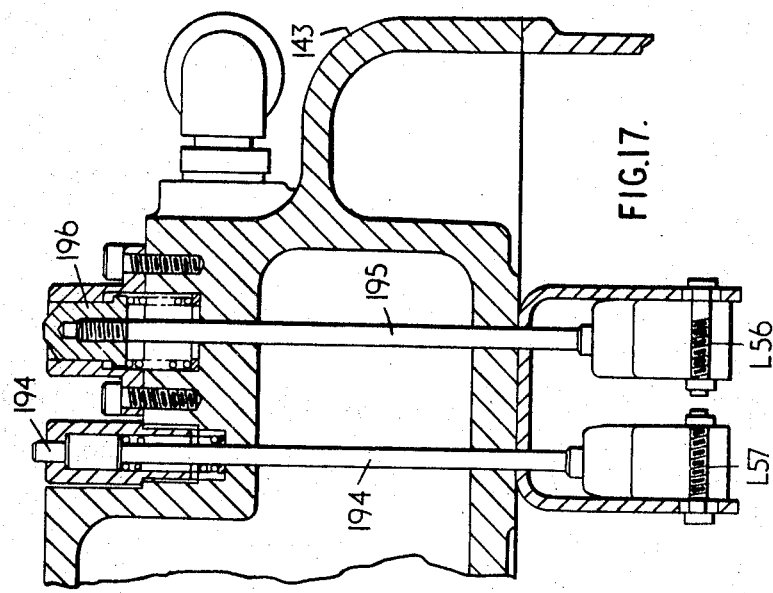
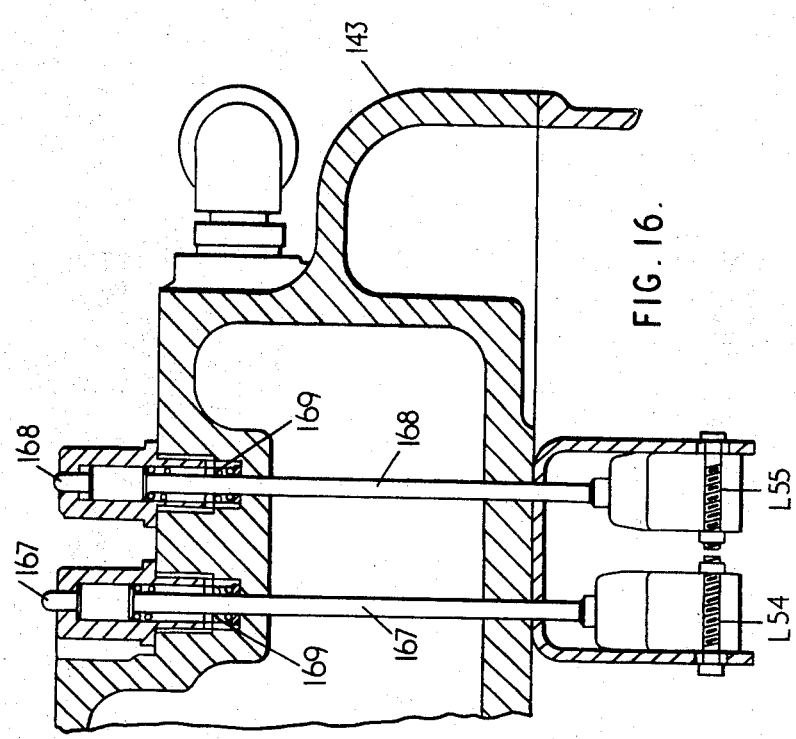

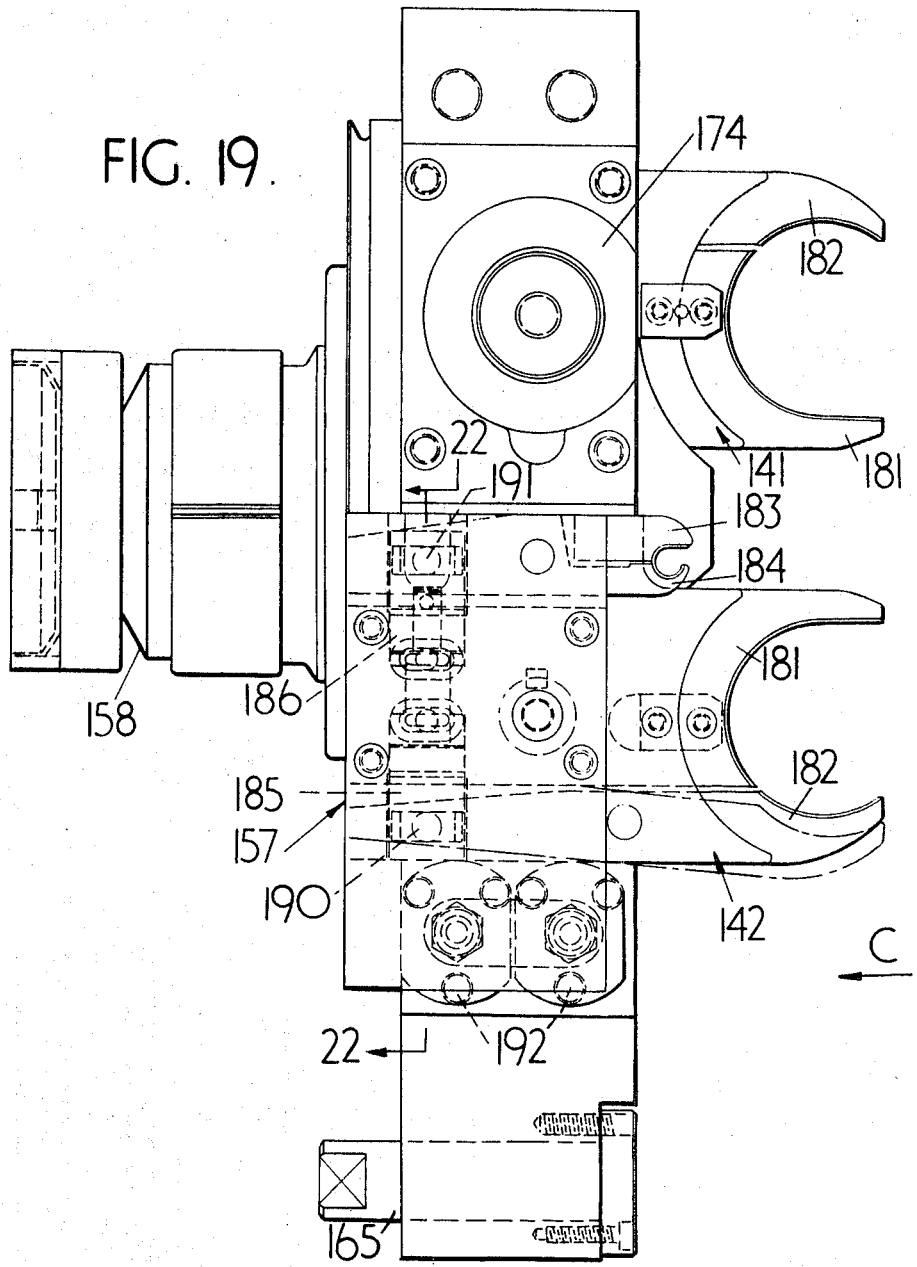

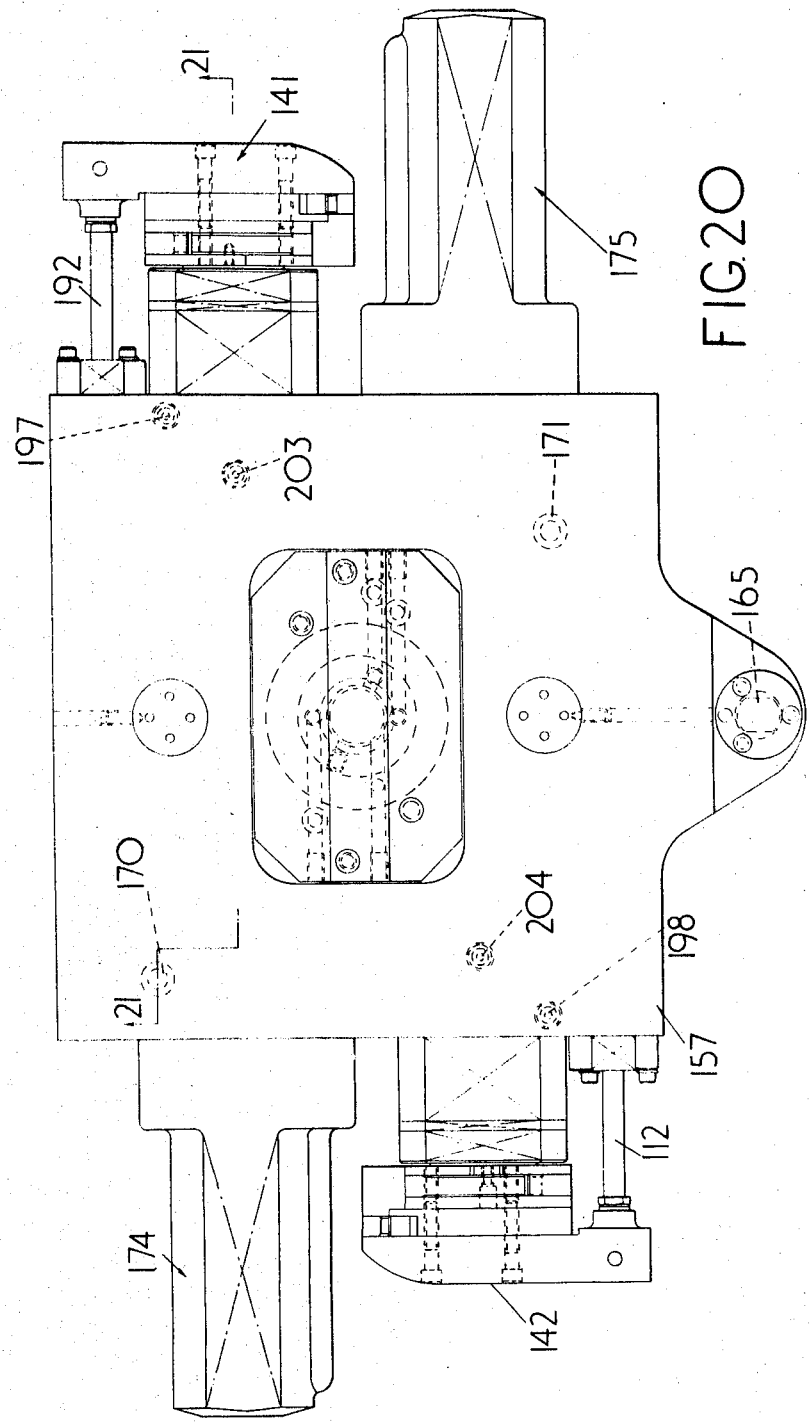

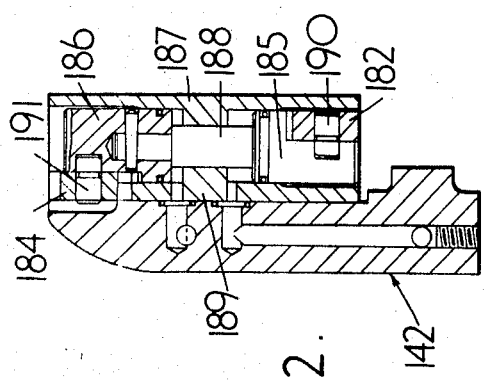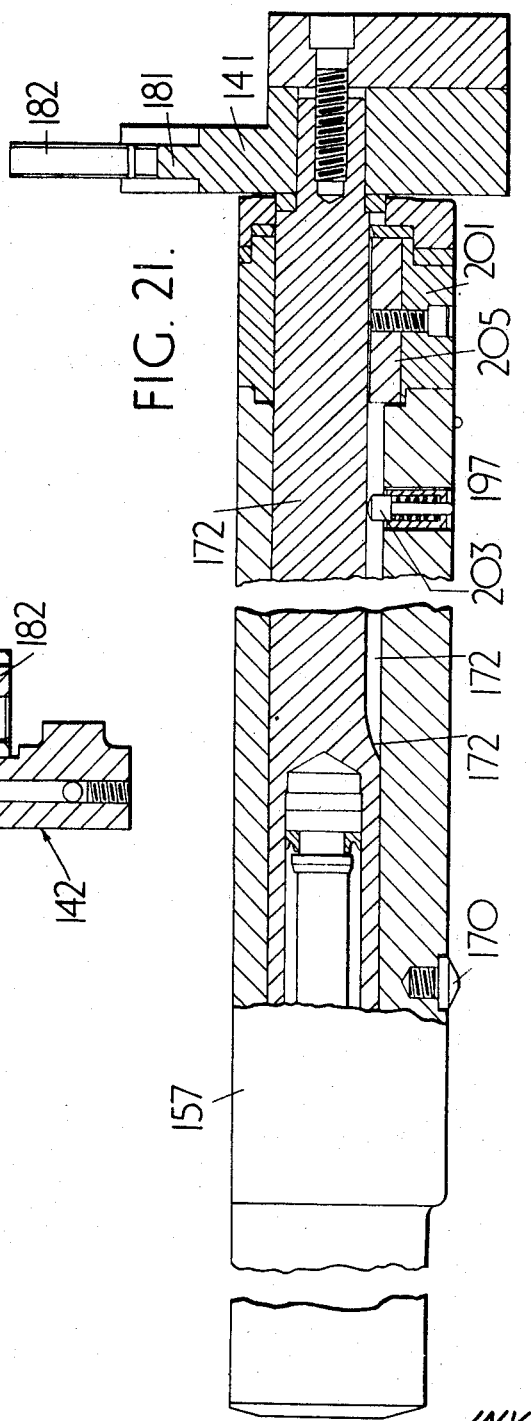

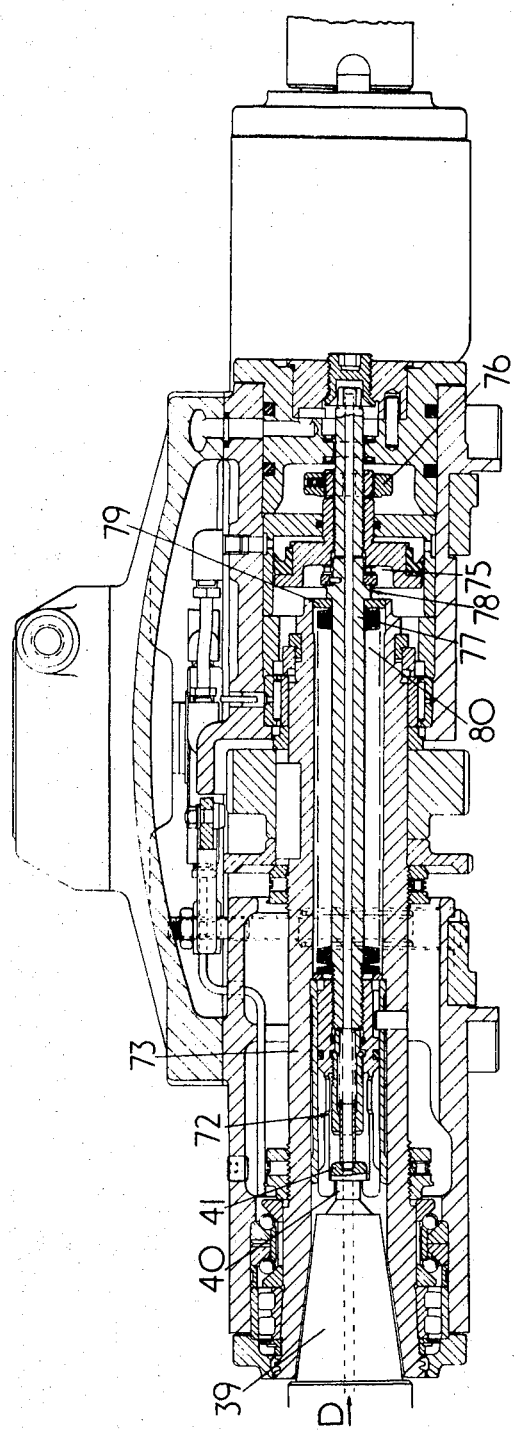

Sept. 29, 1970  D. R. SHOTTER  3,530,570
MACHINE TOOL WITH AUTOMATIC TOOL CHANGE FACILITIES
Filed Feb. 2, 1968  21 Sheets-Sheet 19

INVENTOR
Douglas R. Shotter

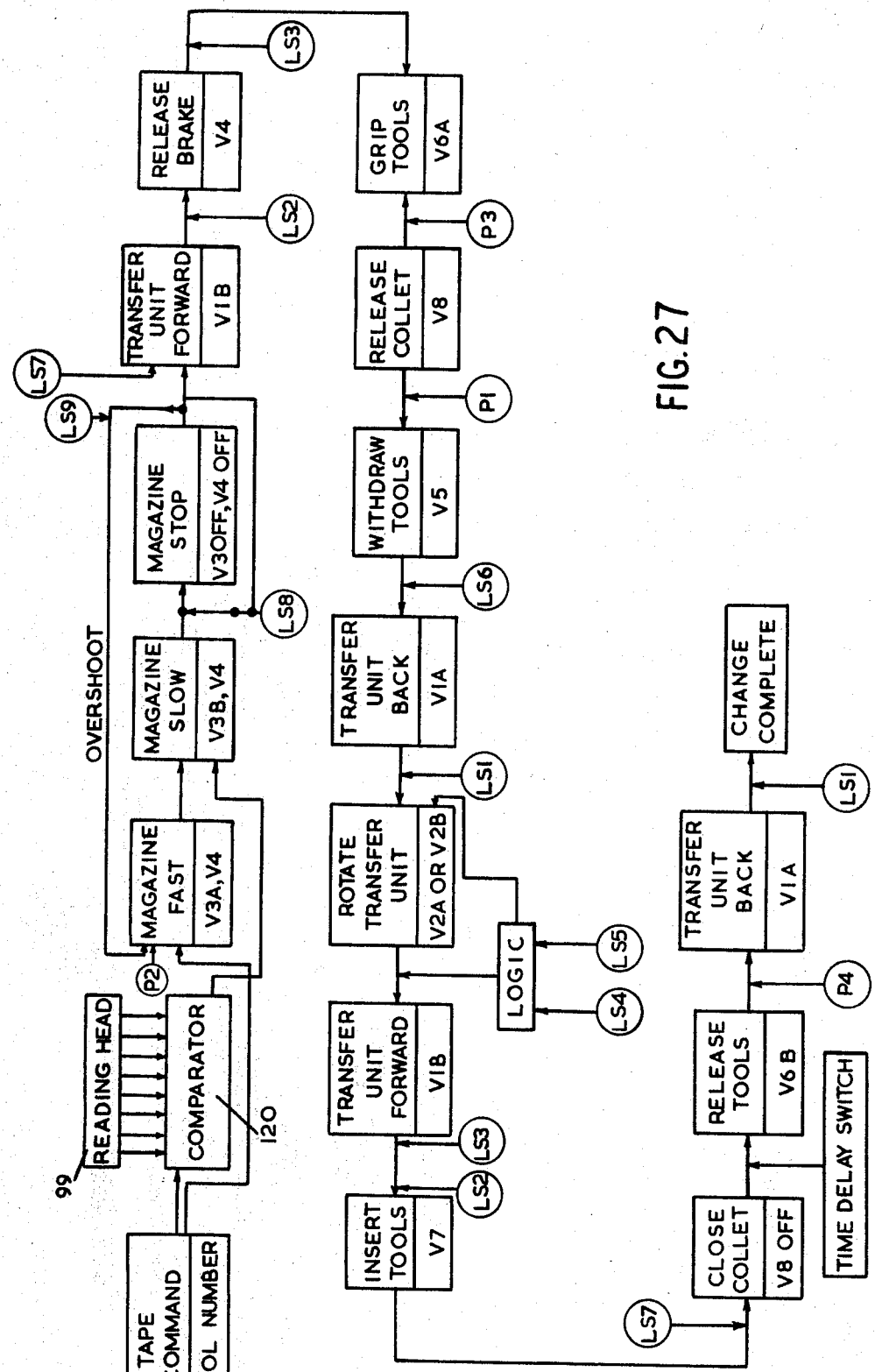

United States Patent Office 3,530,570
Patented Sept. 29, 1970

1

3,530,570
MACHINE TOOL WITH AUTOMATIC TOOL
CHANGE FACILITIES
Douglas R. Shotter, Rugby, England, assignor to Alfred
Herbert Limited, Edgwick, Coventry, England
Filed Feb. 2, 1968, Ser. No. 702,737
Claims priority, application Great Britain, Feb. 2, 1967,
5,108/67
Int. Cl. B23q 3/157
U.S. Cl. 29—568         23 Claims

ABSTRACT OF THE DISCLOSURE

A tool changer is arranged for transferring tools between a magazine and a spindle. The tools in the magazine and the spindle point towards one another and undergo end for end turning during transfer. The transfer mechanism includes grippers on a rotatable and rectilinearly movable head. The grippers are engaged with and disengaged from the tools by rectilinear movement of hte head and are transferred by turning of the head.

The spindle is movable relative to the frame along a single axis and the tool transfer mechanism is movable with the spindle. The magazine includes a chain of individual tool receptacles with one legger of the chain parallel to the axis of movement of the spindle. The chain is so controlled as to bring a desired tool to a predetermined position relative to the tool transfer mechanism for transfer to the spindle irrespective of the position of the spindle.

This invention relates to a machine tool with automatic tool change facilities, and has as an object to provide such a machine tool in a convenient form.

A machine tool in accordance with the invention comprises the combination of a frame, tool mounting means on the frame for receiving tools for operating on a workpiece, a magazine in the frame for the storage of a plurality of different tools for mounting on said tool mounting means, and a tool transfer mechanism mounted on said frame for rotary movement and rectilinear movement in a direction parallel to the rotary axis of said transfer mechanism, said transfer mechanism incorporating a pair of tool engaging gripper devices movable towards and away from the rotary axis of the mechanism and being arranged so that in use, a tool change is effected by moving the mechanism axially to cause said tool engaging devices to engage a tool on the tool mounting means and selected tool in the magazine respectively, moving the tool engaging devices towards the rotary axis of the tool transfer mechanism to remove the engaged tools from tool mounting means and the magazine, turning the transfer mechanism and then moving the tool engaging devices away from the axis of the transfer mechanism to place the engaged tools in the magazine and the tool mounting means respectively.

Reference is now made to the accompanying drawings in which.

2

Figure 1:
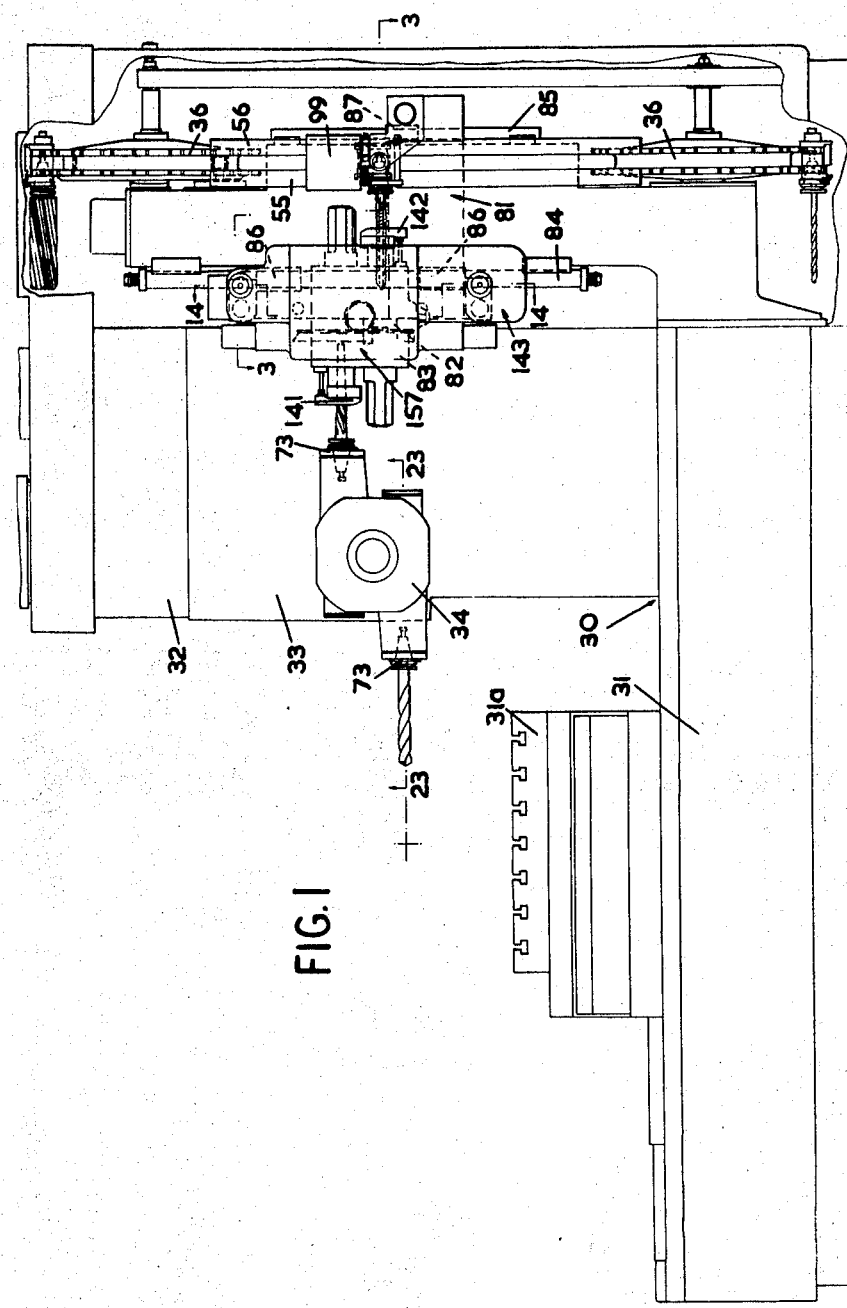
FIG. 1 is a side elevation of a horizontal drilling, boring and milling machine which incorporates an example of the invention, the machine being shown with its cover removed to reveal the operating parts thereof.
Figure 2:
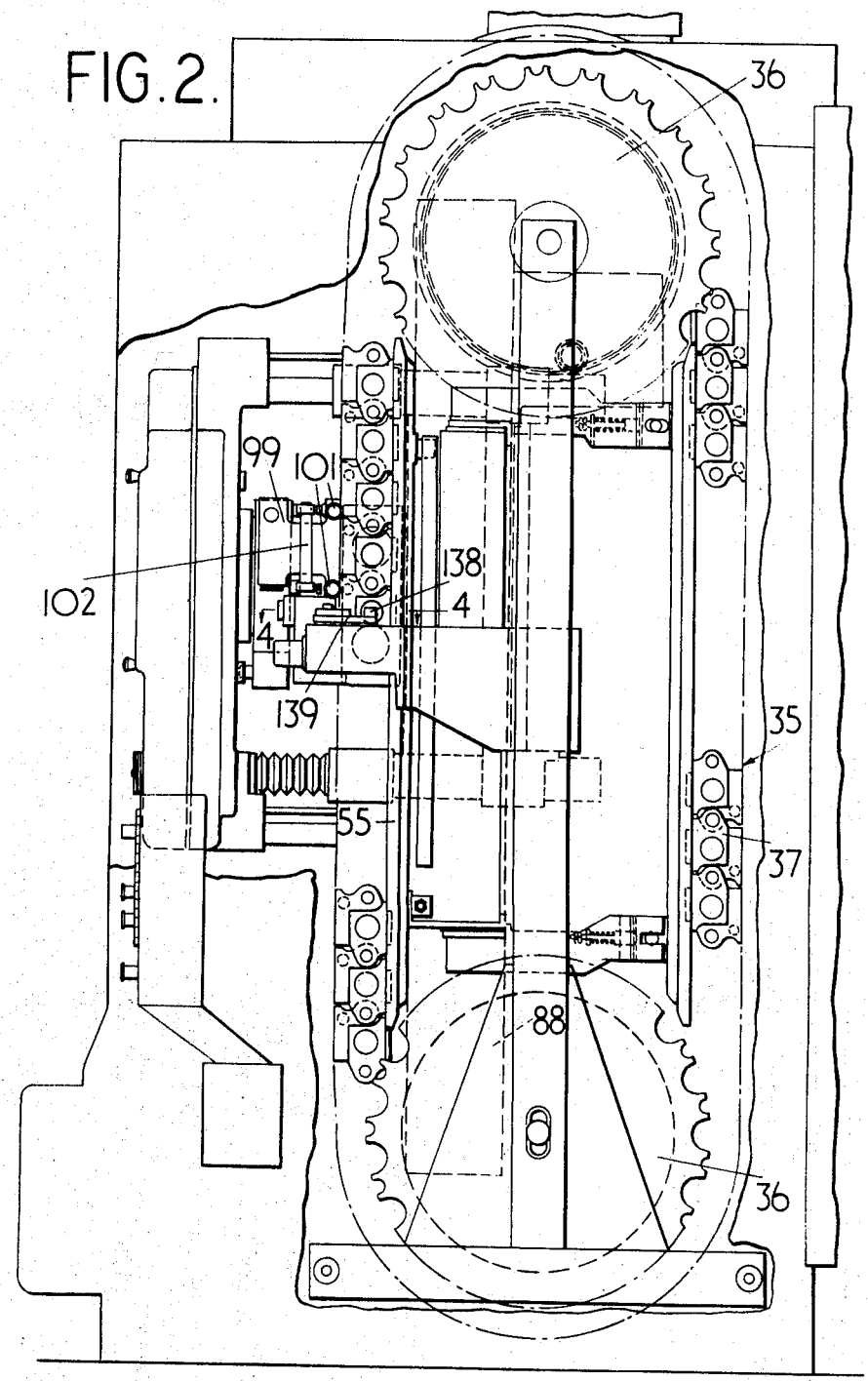
FIG. 2 is an end elevation of the machine.
Figure 3:
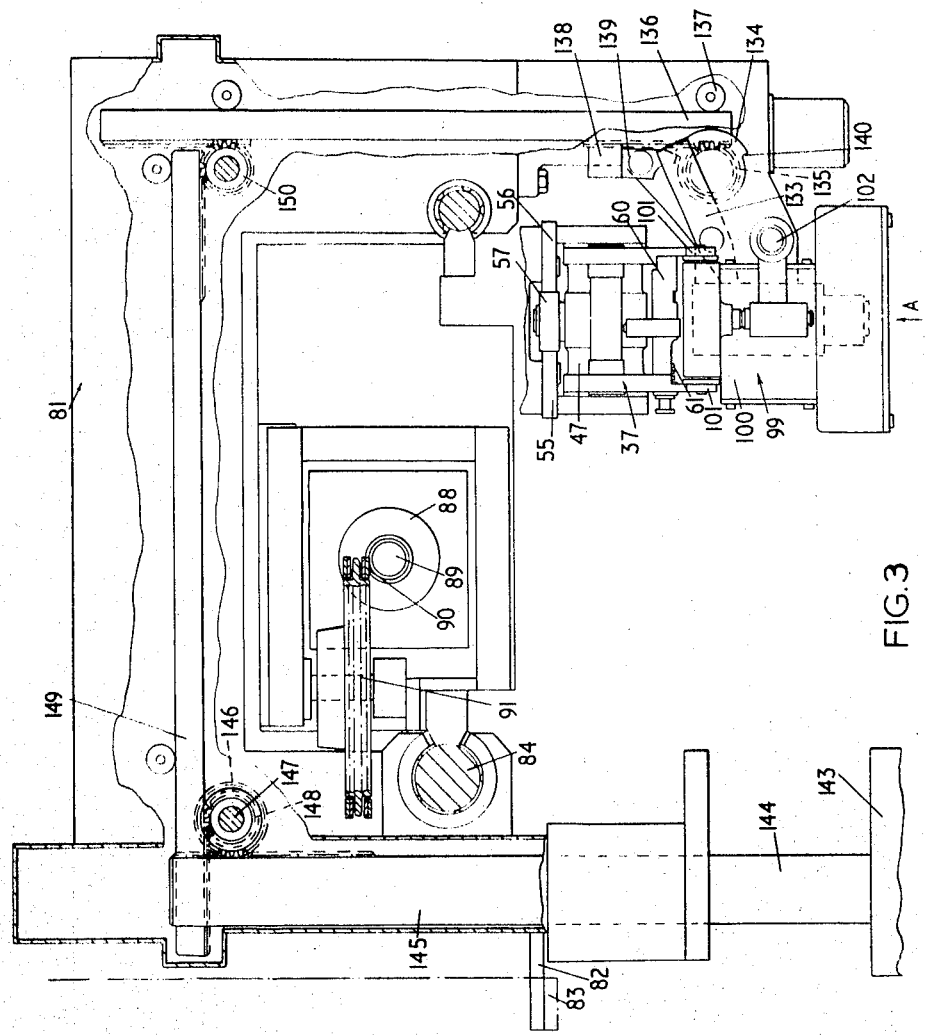
FIG. 3 is an enlarged fragmentary section on line 3—3 in FIG. 1.
Figure 6:
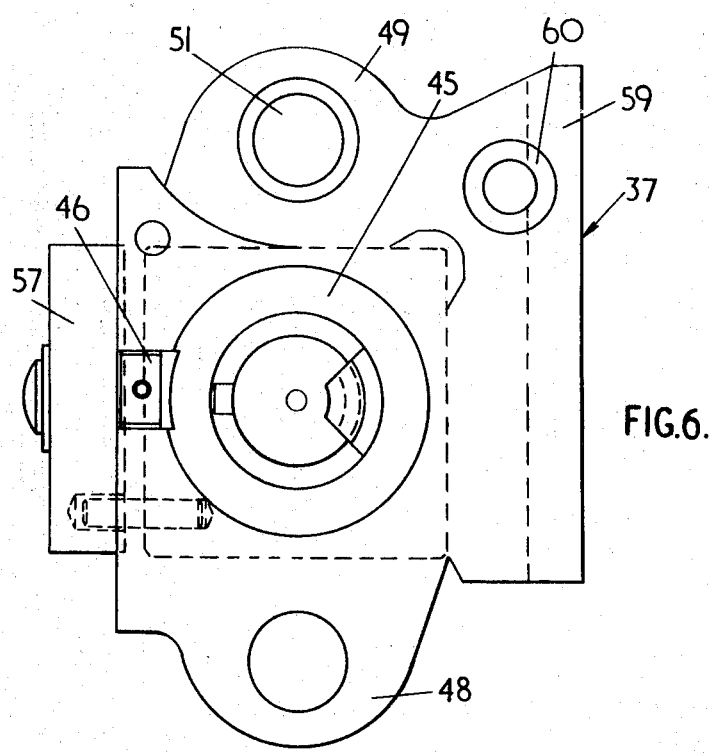
Figure 7:
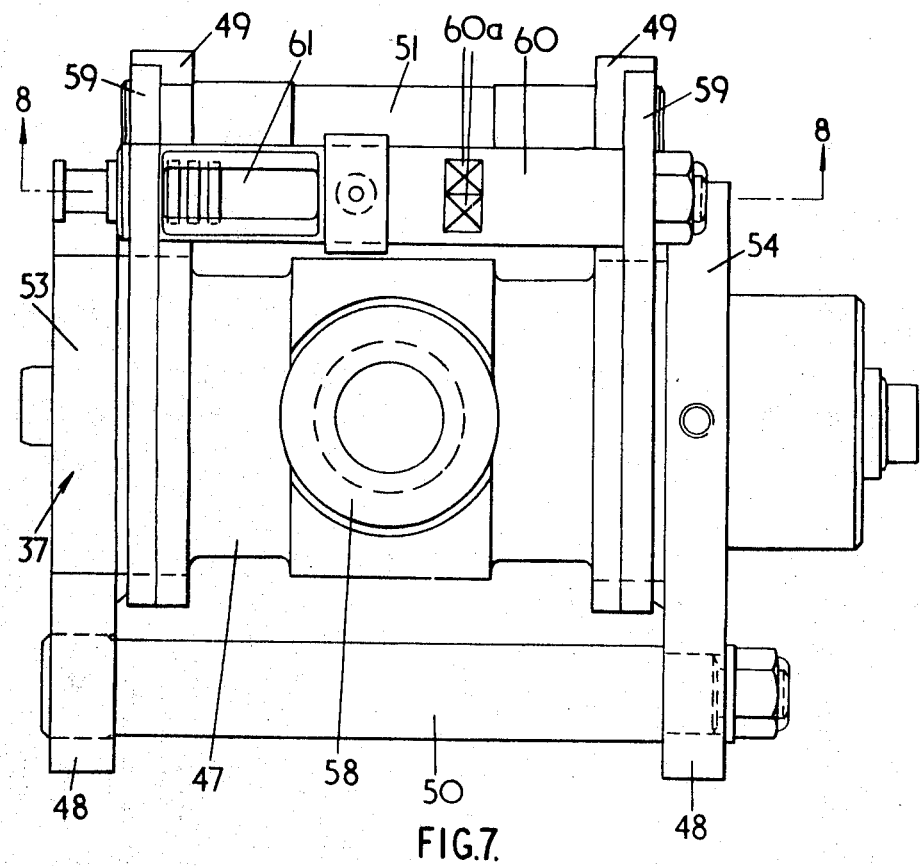
Figure 8:
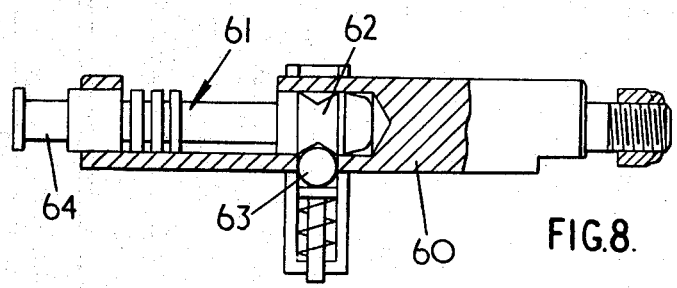
Figure 9:
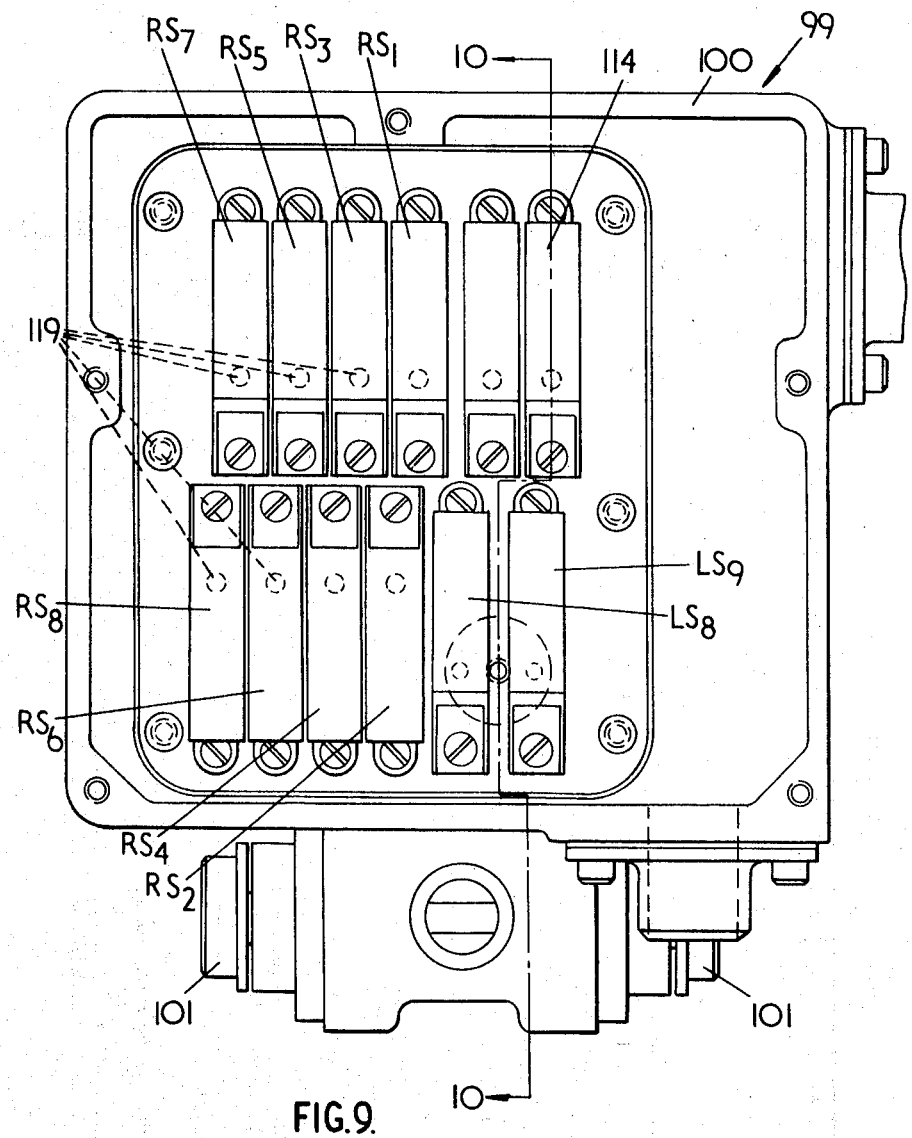
Figure 10:
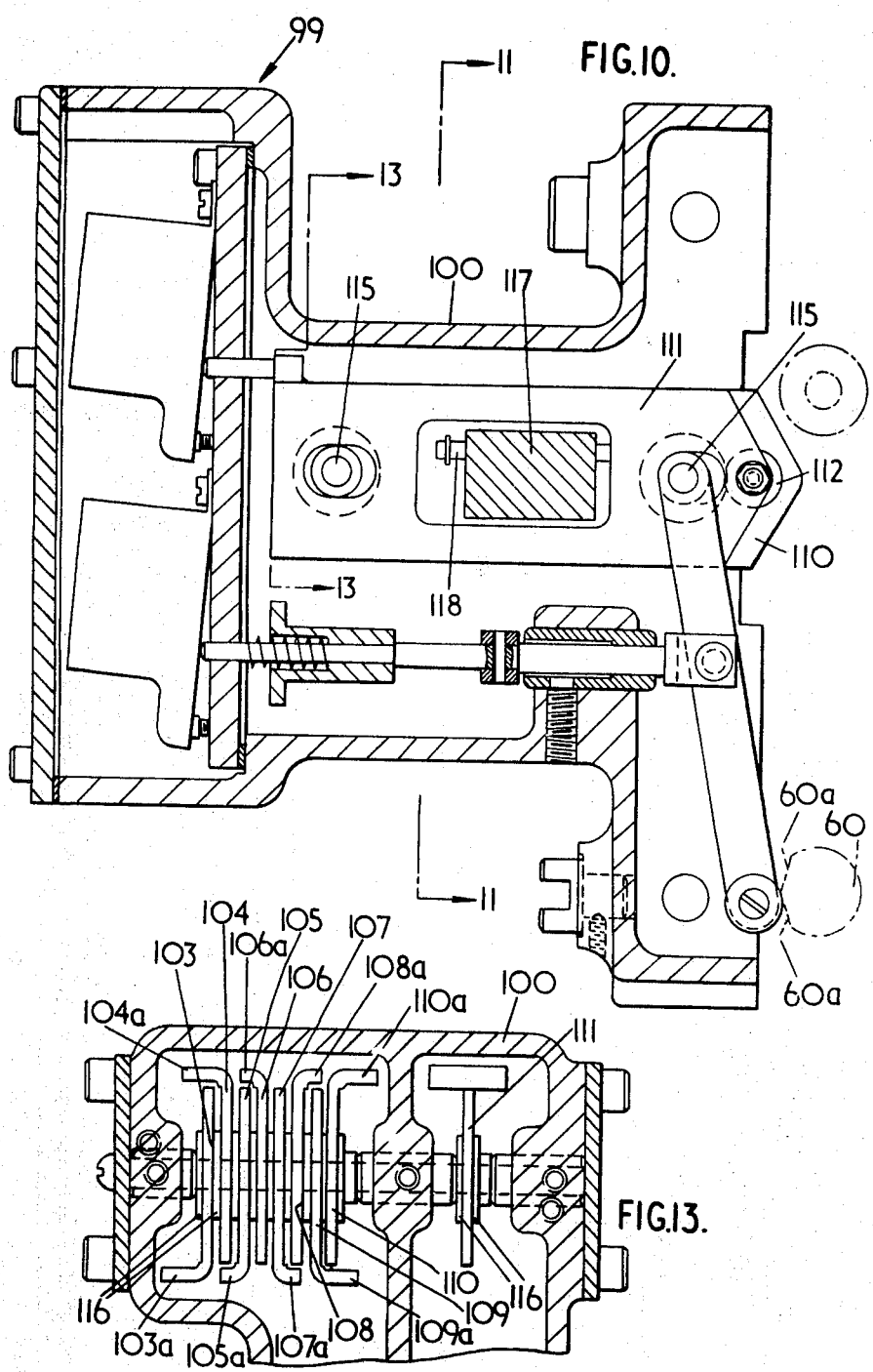
Figure 11:
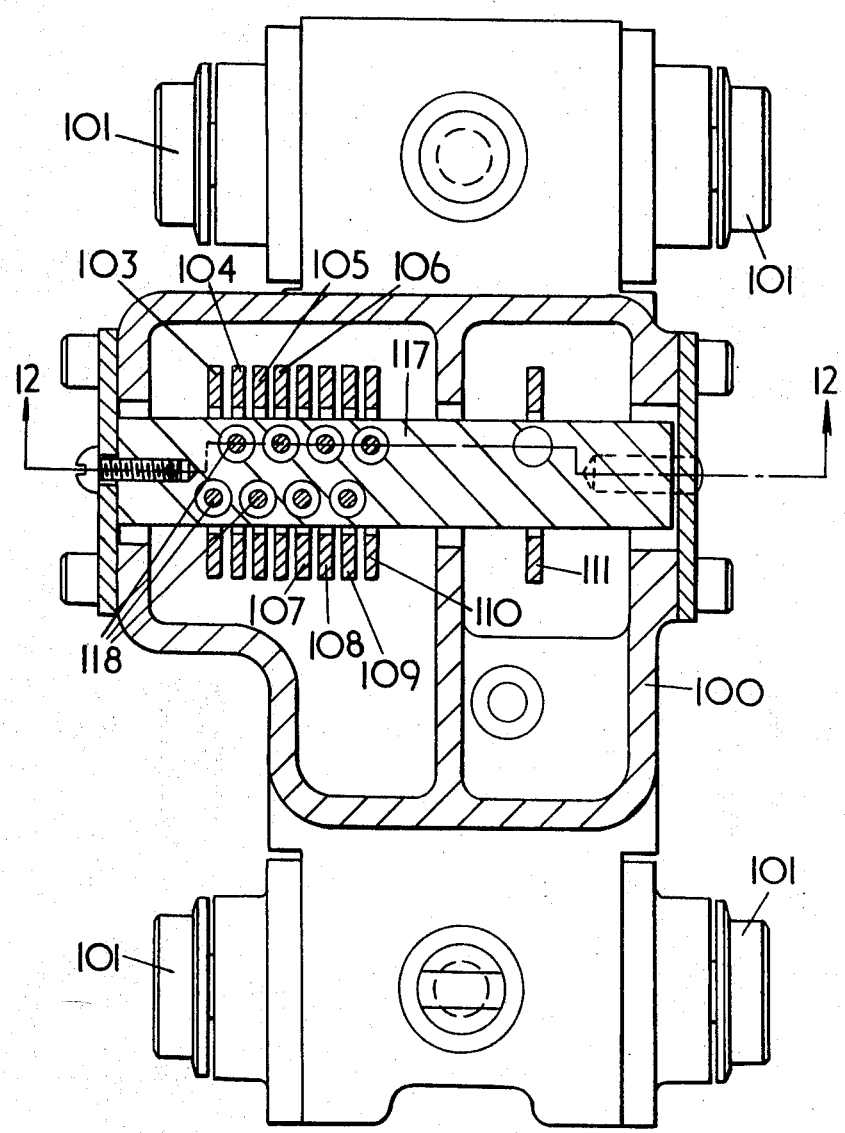
Figure 14:
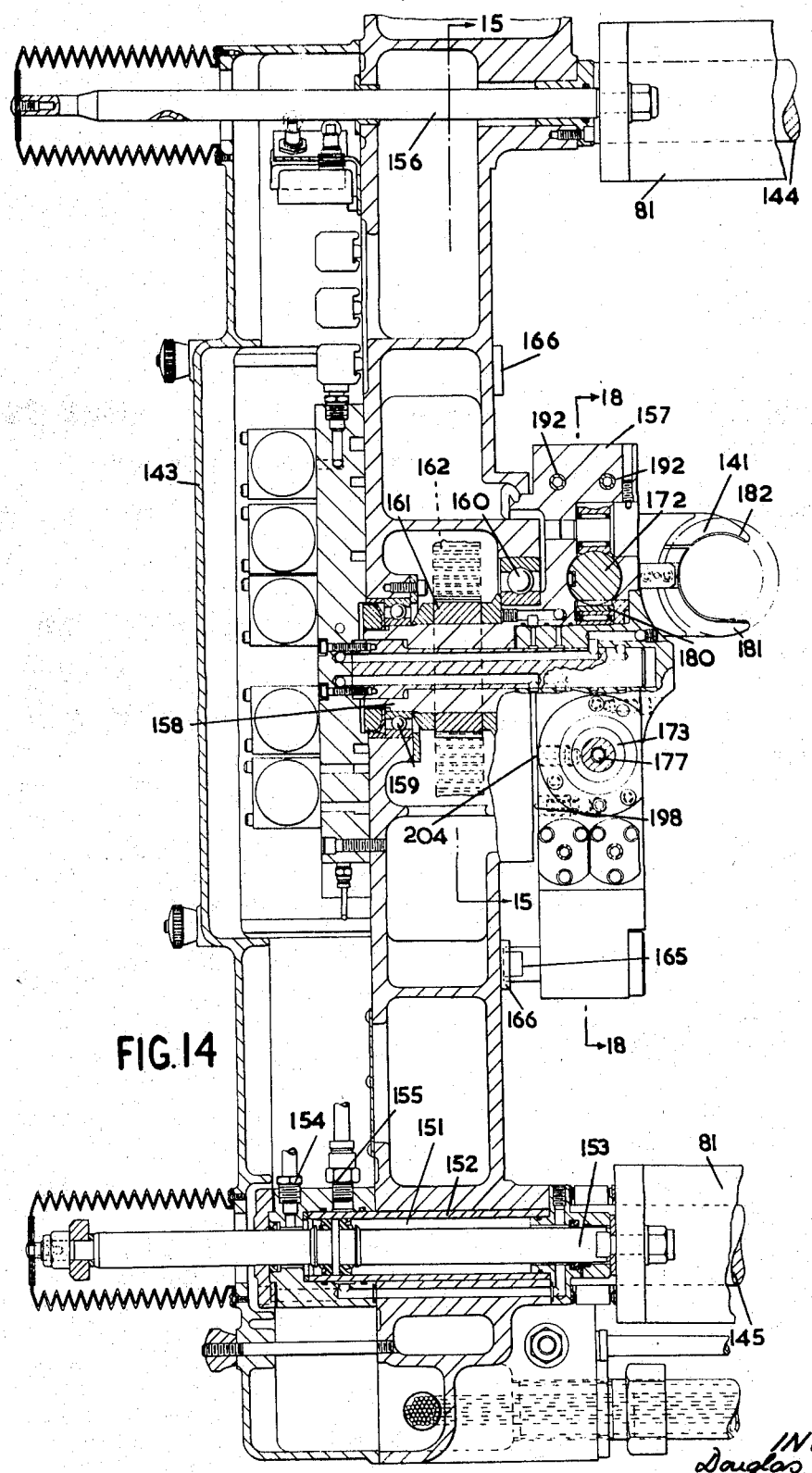
Figure 18:
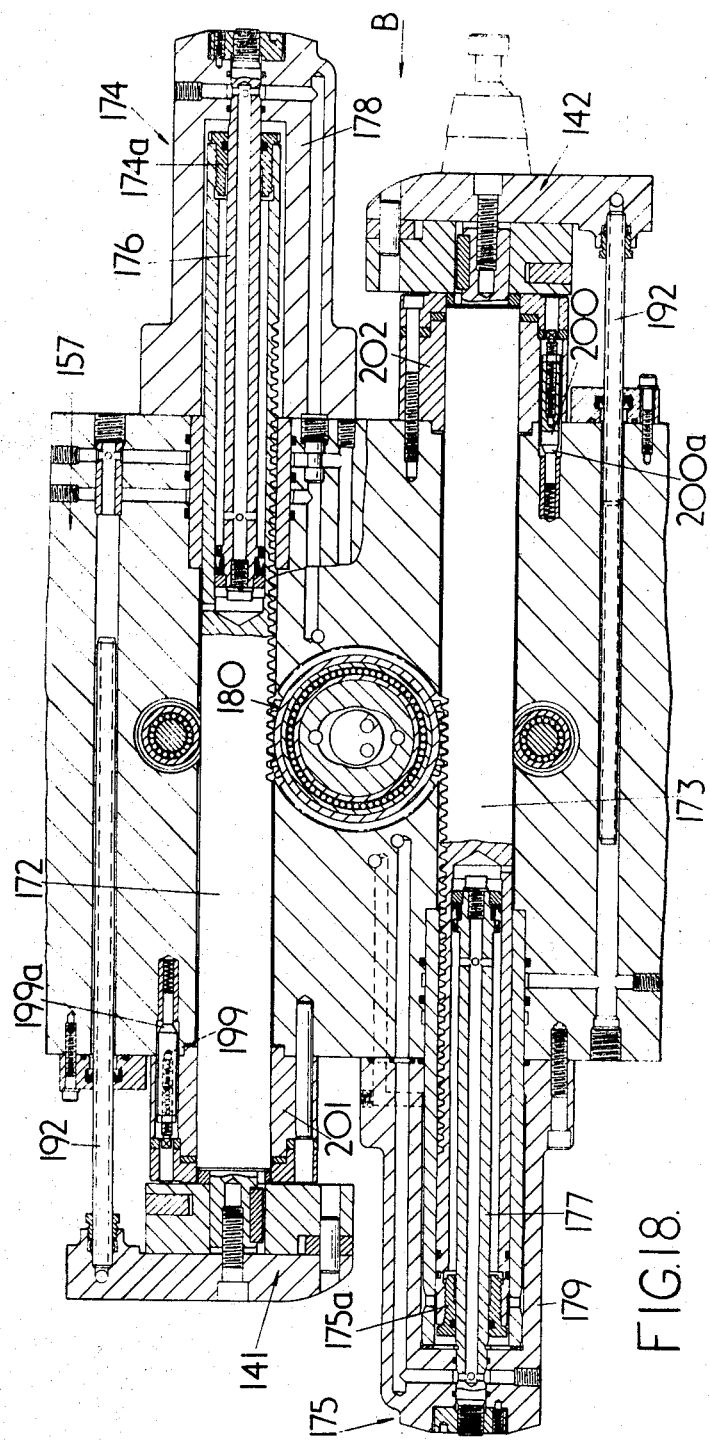
Figure 24:
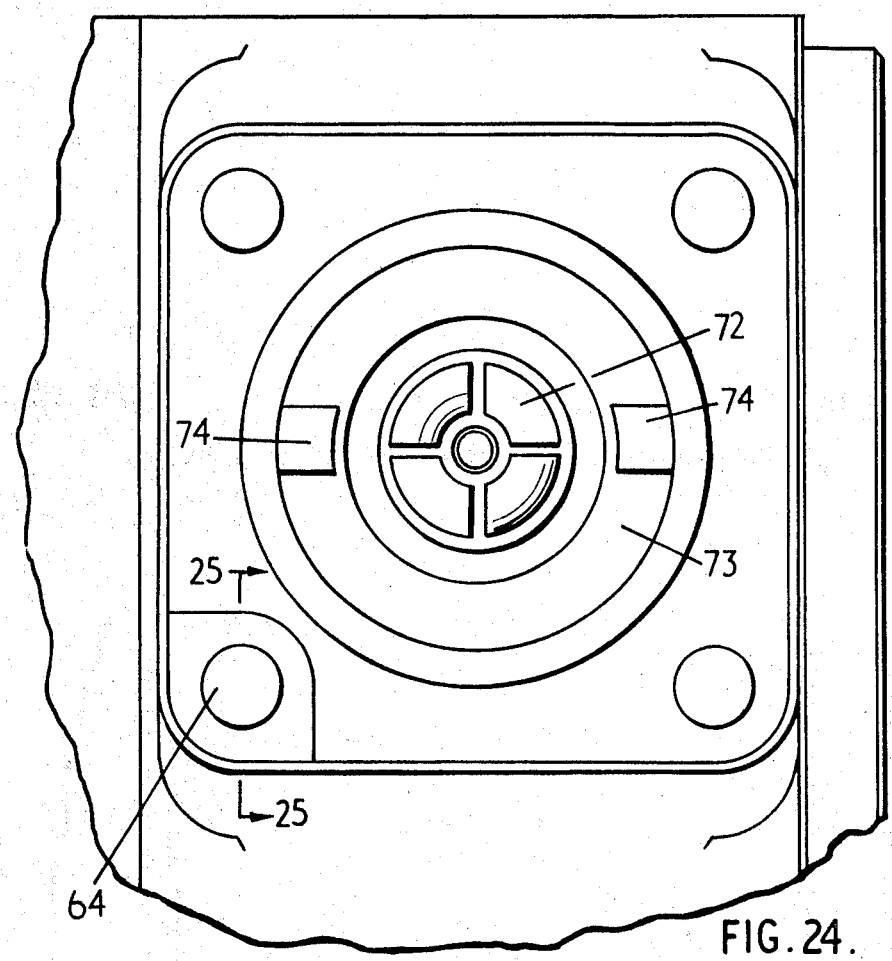
Figure 25:
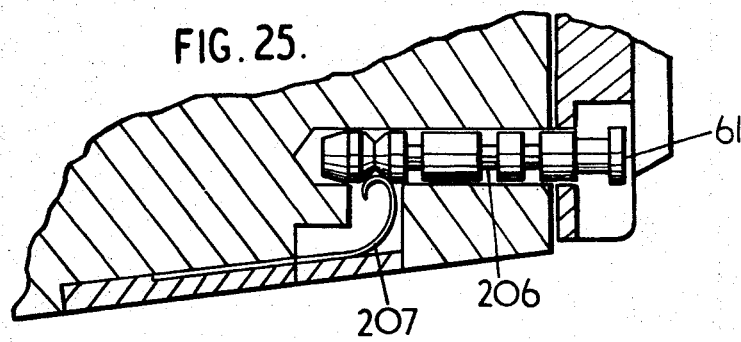
Figure 26:
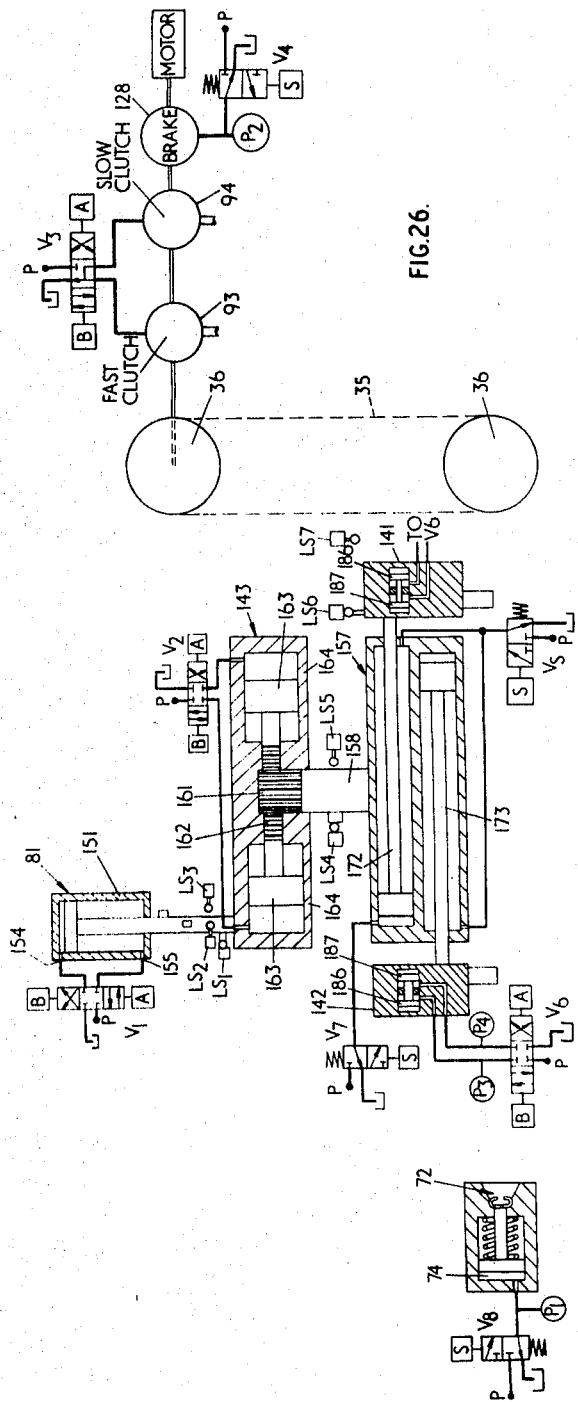

FIG. 6 is an end elevation of the link;

FIG. 7 is a front elevation of the link;

FIG. 8 is a fragmentary section on line 8—8 in FIG. 7;

FIG. 9 is an enlarged view on the arrow A in FIG. 3, showing a tool identification device with its cover removed;

FIG. 10 is a section on line 10—10 in FIG. 9;

FIG. 11 is a section on line 11—11 in FIG. 10;

FIG. 12 is a section on line 12—12 in FIG. 11;

FIG. 13 is a section on line 13—13 in FIG. 10;

FIG. 14 is an enlarged section on line 14—14 in FIG. 1 illustrating a tool transfer device;

FIG. 15 is a section on line 15—15 in FIG. 14;

FIG. 16 is a section on line 16—16 in FIG. 15;

FIG. 17 is a section on line 17—17 in FIG. 15;

FIG. 18 is a section on line 18—18 in FIG. 14;

FIG. 19 is an end view of a part of the tool transfer device in FIG. 14 looking in the direction of the arrow B in FIG. 18;

FIG. 20 is an elevaiton looking in the direction of the arrow C in FIG. 19;

FIG. 21 is a section on line 21—21 in FIG. 20;

FIG. 22 is a section on line 22—22 in FIG. 19;

FIG. 23 is an enlarged section on line 23—23 in FIG. 1, showing part of an indexable tool carrying spindle head;

FIG. 24 is a fragmentary end elevation of the head of FIG. 23 on arrow D in FIG. 23;

FIG. 25 is a fragmentary section on line 25—25 in FIG. 24;

FIG. 26 is a schematic diagram illustrating the hydraulic system of the parts of the machine involved in the tool change operation, and FIG. 27 is a diagram illustrating the basic logic of the tool change controls in terms of the sequence of events during a tool change.

The machine consists basically of a frame 30 consisting of a base 31 and a column 32. Mounted for vertical movement on the column 32 is a slide 33 on which there is pivotally mounted a spindle head 24. The spindle head 34 is pivotable on a horizontal axis relative to the slide and incorporates a pair of spindles, the axes of which are parallel and equally spaced from the pivot axis in a plane perpendicular to the pivot axis. Positive engaging means are provided for locating the head 34 in two alternative positions with the two spindles extending horizontally. An arrangement is provided for transmitting a drive to the spindles, such drive only being transmitted to the spindle which is in the operating position at a given time. It will be appreciated that with an arrangement of this type, a tool carried by one spindle can be exchanged for a new tool, whilst the other spindle is in operation.

The base 31 carries a work table 31a which is movable at a controlled rate of feed in either of two mutually perpendicular horizontal directions. One of these directions is parallel to the pivotal axis of the head 34 and the other is parallel to the axes of the spindles when these are horizontal. Thus, for drilling operations, the work table 31a is fed onto a drill held by the spindle which at that time is in the operative position, whereas for milling operations, the work piece is fed in the transverse direction.

The machine tool is provided with tool change facilities. To this end a magazine for carrying a plurality of different tools is provided. The magazine consists of a plurality of chain links 37, each adapted to carry a single tool, coupled together to form an endless chain 35 and arranged to extend around a pair of spaced co-planar sprockets 36 rotatable on horizontal axes parallel to the axes of the spindles when in their operative positions.

Figure 4:
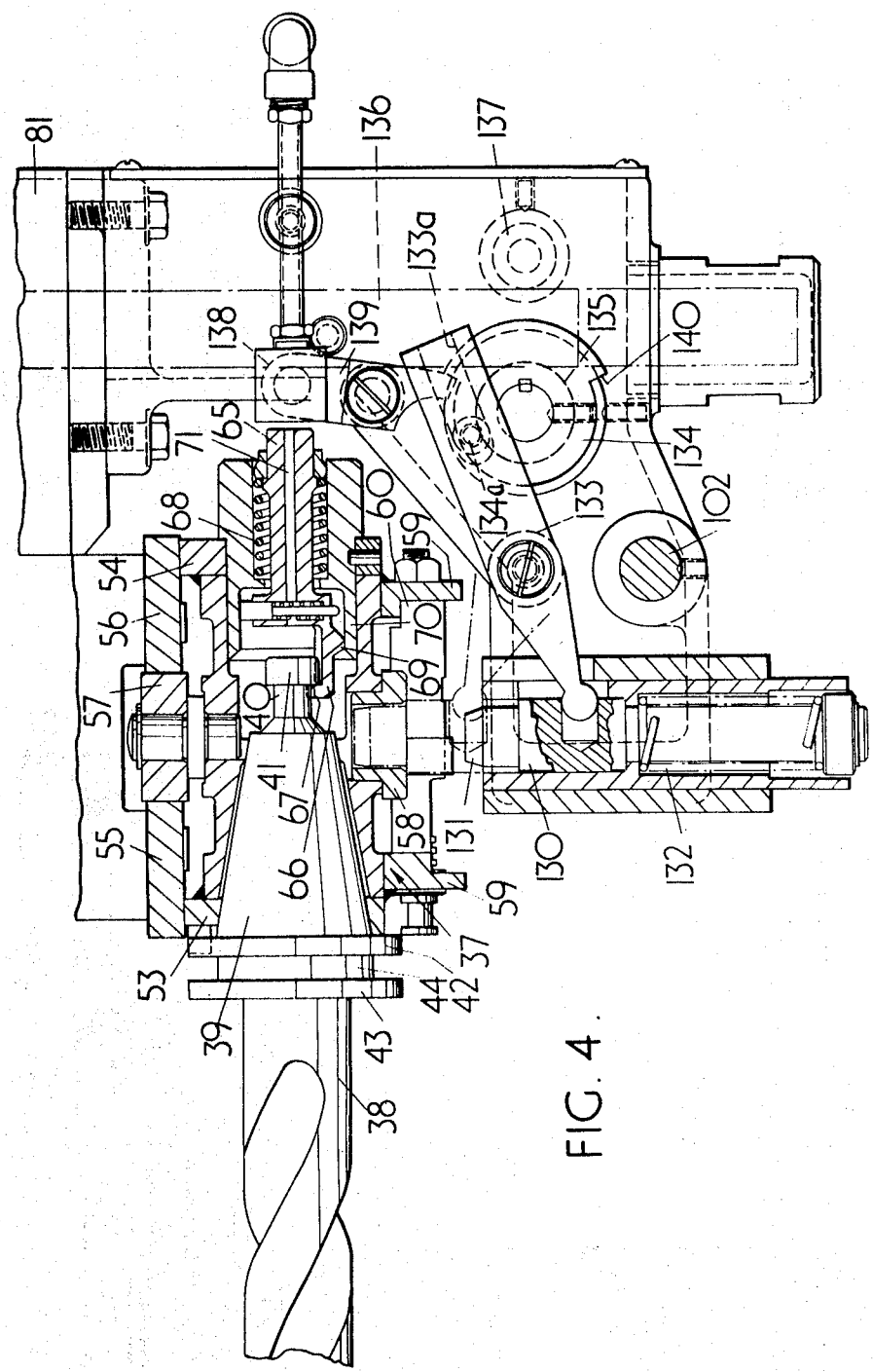
FIG. 4 is an enlarged fragmentary section on line 4—4 in FIG. 2, and showing, in section, a link of magazine chain.
Figure 5:
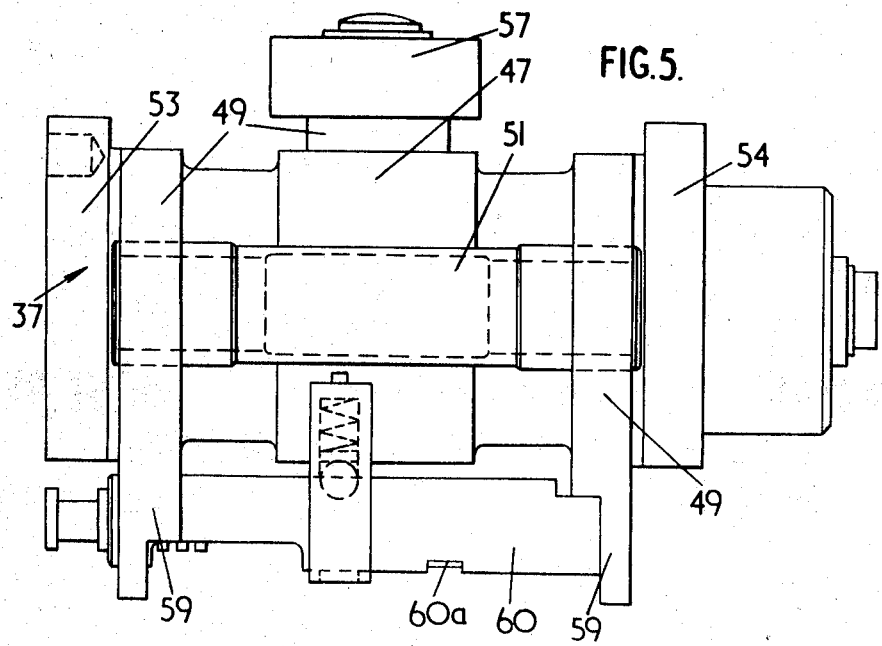
FIG. 5 is a plan view of the link shown in FIG. 4.

A chain link 37 is shown in detail in FIGS. 4 to 8, a coacting tool or tool holder being shown in FIG. 4. The tool 38 has a frusto-conical spigot 39 at the smaller end of which there is an axial peg 40 with an enlarged head 41. At the larger end of the spigot 39 there is a flange 42, and a further spaced parallel flange 43 separated from the flange 42 by an intervening reduced portion 44. The flange 42 is formed with a pair of notches for positive location of the tool relative to the magazine link 37 or the spindle on which it is to be mounted.

The link 37 has a frusto-conical socket 45 which receives the spigot 39 to ensure accurate alignment of the axis of the tool. A key 46 is secured to the link to enter one of the notches in the flange 42 previously referred to. As will be seen from FIG. 6, the key has straight parallel sides, and its centre line is off-set from a radius parallel to these sides. As a result, the link can receive the tool in a unique relative orientation. The link has a body 47 with a first pair of spaced parallel lugs 48 projecting in one direction and a second pair of lugs 49, of lesser spacing, projecting in the opposite direction. The lugs 48 of each link receive between them the lugs 49 of one of the adjacent links of the chain. Pivotal connections between the links 37 are made by means of pins 50 secured between the lugs 48 and running in tubular bearings 51 extending between the lugs 49.

Each link 37 has, at the opposite ends of its body 47, a pair of wear pads 53, 54 of a hard material, and arranged to run on a pair of flat guide rails 55, 56. The wear pad 53 is formed with an opening defining the larger end of the socket 45. Mounted on the link body 47 between the wear pads 53, 54 is an elongated guide shoe 57 which runs in between the rails 55, 56.

Opposite the guide shoe 57 the link body 47, is formed with an opening, transverse to the axis of the socket 45, in which a locating bush 58 is fitted. On this same side of the body 47 there are a pair of spaced parallel side cheeks 59 between which a carrier 60 for a removable tool identification element 61 is mounted. This tool identification element is machined from a length of cylindrical rod to form a pattern of annular grooves characteristic of the element in question. There are eight possible axially spaced positions at which grooves can be formed and, in the actual example described, these are employed in two groups of four to indicate the tens and the units digits of a binary decimal tool number. In this system the tool number 74 would be represented by the binary code 0111–0100, so that the associated element 61 would have a groove at the first position, no grooves at the second, third and fourth positions, a groove at the fifth position, no groove at the sixth position, and grooves at the seventh and eighth positions.

At one end of the element 61 is a groove 62 with sloping sides in which a spring loaded detent 63 engages to retain the element 61 lightly in position in the carrier 60. At the opposite end the element 63 has a shallow groove 64 for gripping the element to withdraw it from the carrier 60. The carrier 60 has a pair of inclined flats 60a.

For holding the tool 38 in position in the socket 45, there is provided a latch piece 65 having a resilient finger 66 with a claw 67 on its free end. The latch piece is spring loaded by a spring 68 to the projecting position shown. In this position an abutment 69 on the finger 66 is engaged within a sleeve 70, so as to cause the claw 67 to be inwardly displaced to the position shown. On movement of the latch piece against its spring loading, the abutment 69 will become disengaged from the sleeve 70, thereby permitting the claw 67 to be displaced by the effect of the resilience of the finger 66, so that a tool previously retained by the latch piece 65 can be withdrawn from the socket 45. The latch piece 65 also provides a passage 71 whereby lubricant can be injected into the interior of the link body 47.

The links 37 of the chain combine together so that on the operative run of the chain, which extends vertically with the tools projecting from the sockets in the links towards the column 32, the side cheeks 59 form a substantially straight and continuous track. Thus tools in the operative run of the chain move along a path spaced from and parallel to the path along which the head 34 is movable.

As shown in FIGS. 23 to 25, the peg 40 and the head 41 co-acts with a collet mechanism 72 within each of the spindles 73 to permit the tool to be drawn into a tapering frusto-conical mouth of the spindle end. The frusto-conical spigot 39 is a close fit in the tapering mouth so as to provide accurately concentric location of the tool on the spindle. A driving connection between the spindle 73 and the tool is provided by off-set dogs 74 on the end of the spindle arranged to enter the aforementioned notches in the flange 42.

The collet mechanism 72 makes use of a single acting hydraulic piston and cylinder unit 75. The cylinder of this unit is fixed within the head 34 whereas the piston is permitted a limited degree of axial sliding movement according to the adjustment of a nut 76 thereon. A hollow rod 77 which extends along the length of the spindle 73 is coupled to the collet mechanism 72 at one end, and adjacent the other end, rotatably extends through the piston of the piston and cylinder unit 75. An annular flange 78 on the rod 76 is engaged by a washer 79 spring-loaded along the spindle 34 by a stack of Bellville washers 80. The piston is thereby resiliently biased in a direction such that the collet mechanism 72 will draw the tool into the spindle 73. When pressurised oil is introduced into the cylinder 75, the piston wll move against the bias and cause the collet mechanism to be displaced along the shaft thereby expelling the tool. After a predetermined movement of hte collet mechanism, the collet jaws spring open to permit complete withdrawal of the tool by the tool transfer mechanism to be hereinafter described. The rod 77 also provides a passageway whereby machining coolant is supplied to the interior of the tool.

The tool transfer mechanism whereby tools can be transferred between the spindles 73 and the magazine includes a frame 81 mounted for vertical sliding motion on guides beside the column 32. The frame 81 is linked to the carriage 33 for vertical movement therewith by means of a slotted plate 82 secured to the frame and an interlocked abutment 83 on the carriage 33. The two guides 84, 85 are in the form of plain cylindrical bars with the bar 84 close to the column and the bar 85 spaced therefrom. The frame 81 is guided by two linear ball bearings 86 on the bar 84, and a single linear ball bearing 87 on the outlying bar 85. The weight of the tool transfer mechanism is counterbalanced by a weight 88 (shown in FIG. 3) sliding on a guide rod 89 and connected via a chain 90 extending over a sprocket 91 to the frame 81.

It will be appreciated, therefore, that there will always be a fixed relationship between the tool transfer mechanism and the spindle 73 which, for the time being, is inoperative. Thus, provided that the desired tool in the magazine can be properly positioned relative to the tool transfer unit, it will be possible to transfer the tool to the non-operative spindle irrespective of its position.

For positioning the tools the upper sprocket 36 is driven by a motor unit 92 which includes a reduction gear box and a pair of hydraulically operated clutches 93, 94 (see FIG. 26) which can respectively connect fast and slowly moving parts of the gear box, to an output pinion 95 engaged with a ring gear 96 on the upper sprocket 36. The motor unit 92 drives the chain 35 so that the operative run thereof moves downwardly. In order to maintain tension in the operative run, therefore, the inoperative run is acted upon by a pair of rails 97, similar to rails 55, 56 for the operative run, but mounted for horizontal movement and urged by springs 98 to force the inoperative run of the chain outwardly.

A reading head 99 is provided for co-acting with the elements 61 in the carriers 60 of the links 37. The reading head 99, which is shown in detail in FIGS. 9 to 13 includes a casing 100 on which rollers 101 are rotatably mounted. These rollers are arranged to run on the substantially continuous track formed by the side cheeks 59 of the links 37 of the operative run of the chain. The casing is carried on a support arm 102 projecting from the frame 81 and is horizontally spring loaded towards the operatvie run of the chain. Thus the reading head 99 is kept vertically in a predetermined positon relative to the frame 81 and is urged by its spring loading to a predetermined horizontal position relative to the vertical path along which the elements 61 travel.

Slidably mounted in the casing 100 are nine flat sensing elements 103, 104, 105, 106, 107, 108, 109, 110 and 111. As shown in FIGS. 10 and 12, each of these has one end projecting from the end of the casing 100, although only the elements 110 and 111 are shown in FIG. 10. The element 111 is different from the remainder of the sensing elements in that its end bears a roller 112 for engaging the carriers 60 of passing links. The sensing elements 111, in fact co-acts with a pair of switches 113 and 114 which are only intended to be used during manual positioning of the frame 81 relative to the chain and play no part in the automatic operation of the machine.

The ends of elements 103 to 110 are of shallow V-shaped configuration so as to be capable of being gently depressed by the passing tool identification elements 61. Each of the elements 103 to 111 is slotted so as to be slidably supported on a pair of spaced parallel rods 115 in the casing 100. Spacing washers 116 are fitted on the rods 115 to maintain the sensing elements in spaced parallel relationship. Each of the elements 103 to 111 also has an aperture through which a bar 117 of rectangular section extends. Nine identical plungers 118 are slidably mounted in parallel bores in this bar 117, and are respectively acted upon by springs 119 in said bores so as to urge the plungers into engagement with the elements 103 to 111 respectively, urging these to projecting positions. As will be seen from FIG. 11, the bores in which the plungers 118 are slidable, are arranged in two rows in a staggered relationship, thereby enabling the spacing between the eight elements 103 to 110 to be kept small.

Each of the elements 103 to 110 has at its end remote from the projecting end thereof, a lug 103a to 110a. These lugs are alternately above and below the elements 103 to 110, and are so bent as to be capable of engaging a plurality of plungers 119 arranged to actuate eight reading switches RS1 to RS8 respectively. These switches are arranged in two tiers with the switches RS1, RS3, RS5 and RS7, in the top tier actuable by the sensing elements 110, 108, 106 and 104 respectively, and the switches RS2, RS4, RS6 and RS8 in the bottom tier for actuation by the sensing elements 109, 107, 105 and 103 respectively.

Thus, in use, as the chain moves past the reading head 99, the individual switches RS1 to RS8 are actuated in accordance with the tool numbers represented by the binary-decimal codings epicted on the elements 61. The outputs of the switches are fed to a comparator 120 (see FIG. 27) which compares the codings read from the elements 61 with the required coding, read from a tape control. The comparator produces an output when the two codings correspond.

For arresting the chain 35 with the required link 37 in exactly the correct position, there is a further pair of switches LS8 and LS9 mounted in the reading head 99. These switches LS8 and LS9 are actuable by plungers 121 and 123 on a member 124 mounted on a push rod 125. The plungers 121 and 123 are of different lengths so that as the rod 125 is displaced, switch LS8 is actuated before switch LS9. The rod 125 is coupled to a depending lever 126 pivoted at its upper end on one of the rods 115, and having a roller 127 at its lower end. The roller 127 is situated several inches below the projecting ends of the reading switch sensing elements 103 to 110, at a position to engage the flats 60a, 60b machined in the carrier 60. The switches LS8 and LS9 are adjusted so that switch LS8 is actuated shortly after the roller 127 has contacted the flat 60a during downward movement of the carrier 60 and switch LS9 is actuated after the roller has rolled over a substantial portion of the flat 60a.

The comparator 120 is connected into the control system of the machine so as to actuate a valve V3 when the correct coding is found. Such actuation causes the clutch 93 to be disengaged and the clutch 94 to be engaged. The chain 35 is thereby retarded to a very much slower speed at which the flat 60a strikes the roller 127. Switch LS8 is thereby actuated and this causes the slow clutch to be disengaged whilst a valve V4, which was previously energised to cause a brake 128 to be disengaged, is de-energized to apply the brake and bring the chain 35 to rest. If the switch LS9 is actuated, the chain has overshot its desired position, and the tool search sequence is restarted: If overshoot occurs again at the completion of the sequence, the machine is automatically closed down and a warning light indicating the nature of the fault is illuminated.

The frame 81 carries, adjacent the arm 102 referred to above, a device 129 for locking the selected link 37 in its desired position relative to the frame 81. This device which is shown in FIG. 4, comprises a plunger 130 with a tapered nose 131 receivable with a pilot action by the bush 58 in the link 37 at the tool transfer position. This plunger 130 is spring-loaded by means of a spring 132 to the withdrawn position shown in full lines in FIG. 4, but can be displaced to the projecting position shown in dotted lines by swinging motion of a lever 133 pivoted to the frame 81 with one of its ends engaged in a recess in the plunger 130. The other end of the lever 133 has a longitudinally extending slot 133a in which a peg 134a eccentrically mounted on a rotatable disc 134 is engaged. The disc 134 is attached to a pinion 135, engaged with a rack 136. The rack 136 is held against the pinion 135 by means of a roller 137.

The disc 134 also actuates a pusher member 138 for engaging the latch piece 65 of a link 37 at the tool transfer position. This pusher member 138 is pivotally mounted on the end of a lever 139, the opposite end of which is engageable by a shoulder 140 on the disc 134.

It will be appreciated that, when the rack 136 is displaced downwardly (as viewed in FIGS. 3 and 4), the disc 134 will be rotated in a clockwise direction. Initially rotation of the disc 134 will only have an effect on the plunger 130, which will be advanced to its projecting position. After the shoulder 140 has engaged the lever 139, however, turning of the disc 134 will also cause displacement of the pusher member 138 to allow disengagement of the claw 67 of the latch piece 65 from the tool end.

For actually transferring the tools between the magazine and the spindles there are a pair of grippers 141, 142 (see FIGS. 14, 19 and 20) which are mounted for compound movement relative to the frame 81. A tool transfer unit carriage 143 has secured to it a horizontally extending pair of guide bars 144, 145 slidable in bearings provided on the frame 81. At their ends remote from the carriage 143, the bars 144, 145 have rack teeth which are engaged by pinions 146 on the ends of a spindle 147, 146 journalled for rotation on a vertical axis. The rack and pinion arrangement ensures that the carriage 143 moves easily and without any risk of a change of orientation. There is also a further pinion 148 on the spindle 147, the pinion 148 engaging rack teeth on a transverse bar 149 with further rack teeth engaging a compound pinion 150. The pinion 180 also engages teeth on the rack 136, so that any motion of the carriage 143 relative to the frame 81 will result in longitudinally displacement of the rack 136 with the results mentioned above.

For driving the carriage 143 forwards (i.e. towards the frame 81) and backwards, there is provided a double acting piston and cylinder unit 151, the cylinder 152 of which is secured to the carriage 143 and the piston rod 153 of which is attached to the frame 81. Pressurised liquid is supplied to the unit 151 via connections 154 and 155 under the control of a three position valve V1 (see FIG. 27).

For sensing the position of the carriage 143 relative to the frame 81 there are three micro-switches LS1, LS2 and LS3 fixed to the carriage in a group around a rod 156 fixed to the frame 81. These switches have roller actuating elements running on this rod which is formed with a pattern of recesses and grooves such that switch LS1 is actuated only when the carriage 143 is furthest from the frame 81 and switch LS3 is actuated only when the carriage 143 is closest to the frame 81. The switch LS2 is not actuated at the former position, but is actuated over substantially the whole of the remainder of the range of movement of the carriage 143.

A tool transfer head 157 is rotatably mounted on the carriage 143 for rotation about a horizontal axis parallel to the direction in which the carriage is movable. In fact the head 157 has an integral tubular trunnion 158 which co-acts with bearings 159, 160 (see FIG. 14) in the carriage 143. Secured to this trunnion 158 is a pinion 161 which is engaged with a rack 162. This rack has a pair of pistons 163 at its opposite ends, only one of these pistons being shown in FIG. 15. These pistons 163 slide in cylinder 164 so that introduction of pressurised fluid into one cylinder 164 or the other will cause the rack to move longitudinally, rotating the head 157 in one direction or the other, admission of liquid being controlled by a three position valve V3. Rotation of the head 157 is limited by a stop 165 thereon, said stop being engageable with a pair of abutments 166, on the carriage 143 at diametrically opposite positions with respect to the trunnion 158. The head 157 can thus be turned through an angle of 180° only.

For sensing the position of the head 157, there are a pair of switches LS4 and LS5 mounted on the carriage 143 in a side by side realationship such that these switches are different radial distances from the trunnion 158. As shown in FIG. 16 the switches LS4 and LS5 are actuable respectively by a pair of elongated actuating stems 167, 168 longitudinally slidable relative to the carriage 143 in a direction parallel to the axis of the trunnion 158. These stems are spring loaded by springs 169 so that the tips 167a, 168a of the stems project towards the head 157. The head 157 is provided with a pair of cam pieces 170, 171 for actuating the switches LS4 and LS5 respectively. The cam piece 170 is situated at a greater radial distance from the trunnion 158 than is the piece 171 and is arranged to actuate switch LS4 when the head 157 is at one extreme angular position. The cam piece 171 actuates the switch LS5 when the head is at its other extreme angular position.

The grippers 141, 142 are respectively mounted on the ends of a pair of bars 172, 173 respectively slidable in a pair of spaced parallel bores in the head, the axis of such bores being equally off-set from the trunnion axis in opposite directions. The bars 172, 173 project from these bores respectively at opposite ends and the arrangement is such that the lowermost bar 172 in the position shown in FIG. 1 projects towards the magazine and the uppermost bar 173 projects towards the spindle head 34. After the head 157 has been turned through 180°, the bar 173 would be lowermost and projecting towards the magazine, whilst bar 172 would be uppermost and projecting towards the spindle head.

Each of the bars 172, 173 is machined out at the end remote from the projecting end to form the cylinder of an hydraulic piston and cylinder unit. The piston rod 176, 177 of each of these units 174, 175 sealingly extends to an annular 174a, 175a on the end of the associated bar 172, 173 and is attached to the base of a cup member 178, 179 which is secured to the head 157 and within the bar 172, 173 is sealingly slidable. Each piston and cylinder unit 174, 175 has fluid passages whereby liquid under pressure can be introduced into the cylinder in the space between the piston of each and the associated cap 76 or 177 for withdrawing the bars 172, 173 to the positions shown in FIGS. 18 and 20. The unit 174 only has a fluid connection to the interior of the cup member 178. Fluid admitted here causes the bar 172 to be extended from the head 157. The two bars are coupled together for unison movement by means of a free pinion 180 engaged between rack teeth on the bars 172, 173.

The grippers 141, 142 are mounted respectively on the projecting ends of the bars 172, 173. Each gripper consists of a main gripper having a fixed jaw 181 and a pivoted jaw 182, and an auxiliary gripper having a fixed jaw 183 and a pivoted jaw 184. The main gripper 181, 182 is intended for gripping a tool, the jaws being engageable with the tool in between the flanges 42 and 43 thereon. The auxiliary gripper 183, 184 is intended for gripping an associated tool identification element 61 in the groove 64 formed therein. The pivoted jaw 182 and 184 of each gripper are coupled to an hydraulic actuating device which comprises a pair of pistons 185, 186 slidable in coaxial bores in the gripper body 187. These pistons are connected together by a rod 188 integral with the piston 185 and sliding through an opening in a wall 189 separating the two bores. A pair of pin elements 190, 191 on the pistons 185, 186 respectively are engaged in slots in the pivoted jaws 182, 184 respectively. In the case of the gripper 142 shown in FIGS. 19 and 22, the pivoted jaws 182, 184 are beneath their respective partners. Thus, on upward movement of the pistons 185, 186, following the introduction of liquid under pressure into the space between the piston 186 and the wall 189, the jaws will open and on downward movement thereof, the jaws will close.

Liquid is supplied to the hydraulic devices for actuating the gripper jaws through the intermediary of four pipes 192, attached to the gripper body 187 and sliding in bores in the head 157.

A limit switch arrangement is provided for detecting whether, at any given time, the bars 172, 173 are extended or retracted. The limit switches LS6, LS7 concerned are mounted, in the same manner as switches LS4 and LS5, on the carriage 143. Switch LS7 has an actuating stem 194 (see FIG. 17) with an end 194a like that of the stems 167a and 168a. The stem 195 of the switch LS6, however, has a different end piece 196 which has a shallow conical face. The switch LS6 is actuated whenever the bars 172, 173 are in their withdrawn positions. The end piece 196 is engageable by either of a pair of diametrically opposite plungers 197, 198 mounted on the head 157 for sliding movement in a direction parallel to the axis of the trunnion 158. Each plunger 197, 198 is spring loaded to a withdrawn position in which it will not engage the end piece 196 when the head 157 is appropriately orientated.

The plungers 197, 198 are displaceable to projecting positions in which they can contact and displace the end piece 196, by means of a pair of slidable cam rods 199, 200 respectively mounted in collars 201, 202 surrounding the bars 172, 173 where these project from the head 157. Each of these rods is spring loaded to project from the associated collar towards the associated gripper 141 or 142. Engagement of the projecting end of each rod 199, 200 by the associate gripper on withdrawal of the bars causes the rods to be displaced against their spring loading, so that bevel portions 199a and 200a engage the respective plungers 197, 198 to displace these to their projecting positions. The provision of the conical face on the end piece 196 takes into account the requirement for the head 157 to be rotated through 180° whilst the rods 172, 173 are withdrawn. The plungers 197, 198 will both be held firmly in their projecting positions during such movement, and when the head approaches the end of its 180° movement of the plungers 197 or 198 approaching the end piece 196 will smoothly depress the latter without risk of damage.

The arrangement for actuating the switch LS7 is rather simpler. Once again there are a pair of spring loaded plungers 203, 204 which are held in withdrawn positions by their spring loading. The plungers 203, 204 respectively engage in keyways 172a in the respective bars 172, 173. The keyway also receives a key 205 secured to the respective collar 201, 202. The keyways 172a are cut, as is usual by means of a rotary cutter so that the ends thereof present smooth ramps 172b. The lengths of the keyways and the positions of the plungers 203, 204 are thus so chosen that when the bars 172, 173 are fully extended the ramps 172b engage and displace the plungers 203, 204 respectively to actuate switch LS7.

The spindle head 34 is provided with a pair of sockets 206 to receive the elements 61 corresponding to the tools for the time being mounted on the spindles 73. For retaining the element 61 in the socket 206 there is a leaf spring 207 which has a curved end engageable in the groove 62 in the element 61. This spring is mounted with the curved end projecting into the socket 206 through an opening in the wall thereof.

Turning now to FIG. 26, the hydraulic devices employed in the tool changing facility of the machine are illustrated diagrammatically, together with the valves controlling them and the various limit switches and pressure switches in turn controlling the valves. All of the valves are solenoid actuated. Valve V1 is a three position twin solenoid valve controlling the piston and cylinder unit 151 for driving the carriage 143 relative to the frame 81. When neither of the solenoids of valve V1 is energised the ports 154, 155 of the unit 151 are both closed. Energisation of solenoid V1A causes the port 155 to be connected to a common pressure source P and portion 154 to be connected to drain. Energisation of solenoid V1B reverses these connections.

Valve V2 controls the turning of the head 157 relative to the carriage 143. The valve V2 is of the same type as valve V1, closing off both ends of the cylinder when not energised and connecting the ends of the cylinder to drain and pressure source P respectively on energisation of one solenoid V2A and reversing these connections on energisation of solenoid V2B.

Valve V3 controls the clutches 93 and 94. When de-energised completely, both clutches are connected to drain. Energisation of solenoid V3A connects clutch 93 only to the pressure source P and energisation of solenoid V3B connects clutch 94 only to the pressure source P.

The brake 128 is controlled by a valve V4 which is a two position, single solenoid valve. When de-energised, the brake is connected to drain and is therefore engaged. Energisation of the solenoid of valve V4 supplies pressure to the brake to disengage it. A pressure switch P2 senses the supply of pressure to the brake.

The valve V5 is a two position single solenoid valve which is energised to supply liquid to withdraw the bars 172, 173 into the head 157. A separate similar valve V7 controls supply of liquid to extend the bars 172, 173.

The two grippers 141, 142 are controlled by a single valve V6 of the three position, twin solenoid type. Energisation of the solenoid V6A causes closing of the jaws and energisation of solenoid V6B causes closing of the jaws. A pair of pressure switches P3 and P4 respectively sense when pressure is applied to grip and release the tools.

Finally the collet mechanism 72 of the spindle 73 for the time being presented towards the tool transfer unit, is controlled by a two position solenoid valve V8, which is energised to release the collet mechanism. A pressure switch P1 senses the collet releasing pressure.

Turning finally to FIG. 27 it is believed that the sequence diagram shown therein would enable a man skilled in the art to produce an electrical or electronic sequence logic circuit for controlling the supply of current to the valve solenoids in accordance with the states of the various limit switches and pressure switches. The complete circuit is therefore not illustrated herein.

The tool selection process already described above will commence on receipt of a tape command at a time when the vertical position of the slide 33 (and hence that of the frame 81) is constant. A machining operation involving one of the spindles 73 will normally be proceeding during the tool selection and tool tranfer operations. Thus, after a machining operation with one spindle 73, the head 34 would be indexed to bring a new tool in the other spindle 73 into play, and any necessary repositioning of the slide 33 would then be effected. The new machining operation and the tool selection and tool transfer sequences could then start simultaneously.

After the desired tool in the magazine has been placed in position for transfer to the non-operative spindle 13, the switch LS8 is actuated and switch LS9 remains unactuated. Valve V1B is then energised to drive the tool transfer carriage forwardly. When switch LS2 is actuated valve V4 is energised to release the brake. The plunger 131 is then driven home into the bush 58 in the link 37 bearing the selected tool to provide a pilot action for accurately positioning the selected link 37 as forward motion of the carriage 143 proceeds. At the end of the forward motion of the carriage, the pusher 138 is displaced to release the latch member 65 so that the tool can subsequently be withdrawn from the link 37. At the completion of the forward motion, which is carried out with the bars 172, 173 extended, so that switch LS7 is in an actuated condition, the jaws of the grippers 141, 142 will be positioned to grip the tool and the element 61 on the non-operative spindle 73 and the tool and the element 61 presented for transfer to the spindle. The completion of the forward movement of the carriage 143 is signalled by switch LS3.

On actuation of switch LS3 valve V6A is energised to close the jaws of the grippers on the tools and the elements 61 after which pressure switch P3 is actuated. Valve V8 is then energised to release the collet, causing pressure switch P, to be actuated. Valve V5 is then energised so that the two bars 172, 173 are withdrawn to remove the tools and the elements 61 from engagement with the link 37 and the spindle.

On actuation of switch LS6, indicating that the tools are fully withdrawn, the valve V1A is energised to return the carriage 143 to its original signal, which movement causes actuation of switch LS1. It is now required to rotate the head 157 through 180° in one direction or the other according to the existing orientation of the head. If switch LS4 is in actuated condition, valve V2A will be energised, and if switch LS5 is in actuated condition, valve V2B will be energised. At the end of the turn the switch LS4 or LS5 not previously actuated will be actuated.

The carriage 143 is then moved forward again switch LS2 being actuated after movement commences so that, if necessary, the now empty link 37 is re-aligned. Actuation of switch LS3 at the completion of the forward motion of carriage 143 causes valve V7 to operate, extending the arms 172, 173 and inserting the tool drawn from the magazine, and the corresponding element 61, into the spindle, and placing the used tool and the corresponding element 61 in the empty link 37.

Actuation of switch LS7 causes de-energisation of valve V8 so that the collet mechanism closes on the tool and draws it firmly into the socket in the spindle 73. A time delay switch is set to operate after a predetermined time, delay commencing when switch P1 is de-actuated. This time delay switch causes valve V6B to be energised so that the grippers 141, 142 can release the tools and the elements 61.

Actuation of switch P4 signals the energisation of valve V1A so that the carriage 143 is moved back to its original position. The mechanism is now ready for the next tool change operation which will commence after the tool just transferred to the non-operative spindle 73 has been carried to its working position by turning of the head 34.

It will, of course, be appreciated that the details given above are purely by way of example, and are in no way intended to limit the scope of the invention as defined in the following claims.

Having thus described my invention what I claim as new and desire to secure by Letters Patent is:

1. A machine tool comprising the combination of a frame, tool mounting means on the frame for receiving tools for operating on a workpiece, said tool mounting means receiving a tool, in use, by movement of the tool, in a first direction and a tool being removable from the tool mounting means by movement of the tool in a second direction opposite to said first direction, a magazine on the frame for the storage of a plurality of different tools for mounting in the magazine, a tool being removable from the magazine by movement of the tool in said second direction and replaceable in the magazine by movement in said first direction, and a tool transfer mechanism for transferring tools between the magazine and the tool mounting means, said transfer mechanism incorporating a tool transfer carriage, a tool transfer head mounted for rotary movement on said about an axis perpendicular to said first and second directions, power means for indexing the head between two operative positions spaced by 180°, power means for displacing the carriage in a direction parallel to the rotary axis of the head, a pair of tool engaging gripper devices mounted on said head for movement relative thereto in directions parallel to said first and second directions when the head is in either of its operative directions, said gripper devices being engageable with and disengageable from tools on the tool mount means and in the magazine by axial movement of the head, power means on the head coupled to said gripper devices for simultaneously moving the gripper devices in said directions towards and away from one another and the rotary axis of the head and sequence control means controlling the head indexing power means, the carriage displacing power means and the gripper device moving power means, whereby in use a tool change is effected by moving the carriage axially to cause said tool engaging gripper devices to engage a tool on the tool mounting means and a selected tool in the magazine respectively, moving the tool engaging gripper devices towards the rotary axis of the head to displace the engaged tools on the tool mounting means and in the magazine in said first and second directions respectively so as to remove the engaged tools from the tool mounting means and the magazine, indexing the head, moving the tool engaging gripper devices away from the rotary axis of the head to place the engaged tools in the magazine and the tool mounting means respectively, and then displacing the carriage axially to disengage the tool engaging gripper devices from the tools.

2. A machine tool as claimed in claim 1 in which said means mounting the carriage on the machine tool frame incorporates a plurality of parallel bars on the carriage, bearings on the frame for guiding said bars, said bars being formed with rack teeth, a pair of pinions on the frame engaged with the rack teeth respectively, and a spindle to which said pinions are secured.

3. A machine tool as claimed in claim 2 in which said carriage is movable relative to the frame by means of an hydraulic piston and cylinder unit with its cylinder attached to the carriage and its piston connected to the frame.

4. A machine tool as claimed in claim 3 in which the sequence control means includes switches sensitive to the position of the carriage relative to the frame and a rod attached to the frame and having formations thereon for actuating said switches respectively at opposite extremes of the travel of the carriage.

5. A machine tool as claimed in claim 4 in which the means mounting the head on the carriage comprises a trunnion on the head engaged with bearings in the carriage.

6. A machine tool as claimed in claim 5 in which the means for driving the head relative to the carriage comprises a pinion on said trunnion, and a reciprocable rack engaged with said pinion and mounted on the carriage, and hydraulic piston and cylinder means for reciprocating said rack.

7. A machine tool as claimed in claim 6 in which there are interengageable stops on the carriage respectively to limit angular movement of the head relative to the carriage.

8. A machine tool as claimed in claim 7 including a pair of switches of said sequence control means mounted on said carriage and operable by cam means on the head when the latter is at the respective limits of its angular travel.

9. A machine tool as claimed in claim 8 in which the means mounting the gripper devices on the head comprises a pair of spaced parallel elongated bars slidable in bores in the head with their axes equally spaced from and in a plane perpendicular to, the axis of rotation of the head, said bars projecting from the head at opposite sides and said gripper devices being attached to the bars.

10. A machine tool as claimed in claim 9 in which said bars are interconnected for movement in unison by means of a free pinion co-axial with the rotary axis of the head and engaging rack teeth formed on said bars.

11. A machine tool as claimed in claim 10 in which the means for moving the gripper devices relative to the head comprises hydraulic piston and cylinder means of which said bars, being formed at their ends remote from the respective gripper devices with bores, form the cylinders.

12. A machine tool as claimed in claim 11 in which said gripper devices each comprise a body, a fixed jaw on said body and a pivoted jaw on said body, selectively operable means under the control of said sequence control means being provided for moving the pivoted jaw towards and away from the fixed jaw for engaging and releasing a tool.

13. A machine tool as claimed in claim 1 in which said magazine incorporates means for locating a plurality of coded tool identification elements associated respectively with the tools, and in which the magazine incorporates power drive means for propelling the tools and the associated tool identification elements in the magazine around a predetermined closed path relative to the tool transfer mechanism, the tool transfer mechanism, including a reading head which co-acts with the tool identification elements to control the power drive means for arresting the magazine with a tool therein present to the tool transfer mechanism for transfer to the tool mount means.

14. A machine tool as claimed in claim 1 in which the magazine comprises a plurality of individual tool locating devices interlinked to form a continuous chain and sprockets between which said chain extends.

15. A machine tool comprising a frame, tool mount means on said frame for receiving a tool for operating on a workpiece, said tool mount means being movable relative to the frame on a predetermined path, a tool magazine mounted on the frame independently of the tool mount means and incorporating a plurality of individual tool locating means and drive means for moving said tool locating means around a closed path including a leg which is parallel to at least a portion of the path and along which said tool mount means are movable, and tool transfer means movable with said tool mount means and adapted on actuation to transfer the tool from a tool locating means in said leg of said closed path to said tool mount means.

16. A machine tool as claimed in claim 15 in which said individual tool locating means of the magazine are interconnected to constitute a chain.

17. A machine tool as claimed in claim 15 in which said tool transfer means comprises a tool transfer frame coupled to the tool mount means for movement therewith along at least said portion of the path thereof, a pair of grippers for engaging tools in the magazine and on the tool mount means, and means for moving the grippers relative to the tool transfer frame to cause them to engage said tools, withdraw them from the magazine and tool mount means respectively, interchange the positions of the tools, engage the interchanged tools with the tool mount means and the magazine, and to disengage the grippers from the tools.

18. A machine tool as claimed in claim 15 in which the individual tool locating means bear tool identification elements whereby the tool carried by each tool locating means can be uniquely identified, and in which said tool transfer frame carries a reading head which co-acts with said tool identification elements to bring a required tool locating means to rest at a predetermined tool transfer position relative to the tool transfer frame.

19. A machine tool as claimed in claim 18 in which said individual tool location means have portions adapted in combination, to form a substantially continuous track along said leg of the path followed thereby, said reading head having rollers engageable with said track to guide the reading head relative to the tool location means.

20. A machine tool as claimed in claim 19 in which said magazine incorporates a drive means adapted to drive said tool location means at two different speeds, and said reading head includes an array of switches sensitive to plurality of differently situated code portions of the tool identification elements, and connected to a control means for the drive means so as to cause the drive means to change from high speed driving to low speed driving on recognition of a tool identification element associated with a required tool, and a further switch actuable by a part of the selected tool locating means and connected to said control means to arrest the selected tool locating means on actuation of said further switch immediately following recognition of the tool identification element.

21. A machine tool as claimed in claim 20 in which the reading head includes an additional switch actuable by said part of the tool locating means on movement of the latter beyond the position required to actuate said further switch by more than a predetermined distance, said additional switch being connected to said control means to cause the drive means to revert to high speed driving on actuation of said additional switch resulting from the selected tool location means overshooting the position at which it is desired to arrest it.

22. A machine tool as claimed in claim 15 in which the frame includes an upright column and in which said tool mount means is a rotary spindle carried by a slide vertically movable on said column, said leg of the closed path along which the tool mounting means are movable being vertical.

23. A machine tool as claimed in claim 22 in which there are a plurality of spindles journalled in a head indexably mounted on said slide and arranged to permit the tool in a spindle which is out of service to be exchanged for a new tool, whilst a machining operation is being carried out by a tool in the other spindle.

References Cited
UNITED STATES PATENTS 3,052,011    9/1962    Brainard et al.     29—568
3,256,600    6/1966    Swanson et al.     29—568

FRANCIS S. HUSAR, Primary Examiner